United States Patent
Wang et al.

(10) Patent No.: US 11,678,325 B2
(45) Date of Patent: Jun. 13, 2023

(54) TECHNIQUES FOR SIDELINK RESOURCE SELECTION

(71) Applicant: QUALCOMM Incorporated, San Diego, CA (US)

(72) Inventors: Xiaojie Wang, Hillsborough, NJ (US); Yisheng Xue, San Diego, CA (US); Jing Sun, San Diego, CA (US); Junyi Li, Chester, NJ (US); Piyush Gupta, Bridgewater, NJ (US); Xiaoxia Zhang, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/110,216

(22) Filed: Dec. 2, 2020

(65) Prior Publication Data

US 2022/0174711 A1    Jun. 2, 2022

(51) Int. Cl.
*H04W 24/10*    (2009.01)
*H04W 72/20*    (2023.01)
(Continued)

(52) U.S. Cl.
CPC .............. *H04W 72/20* (2023.01); *H04L 43/16* (2013.01); *H04W 24/10* (2013.01); *H04W 80/02* (2013.01)

(58) Field of Classification Search
CPC ............. H04W 72/1278; H04W 24/10; H04W 80/02; H04L 43/16
See application file for complete search history.

(56) References Cited

U.S. PATENT DOCUMENTS

| | | | |
|---|---|---|---|
| 10,548,086 B2 | 1/2020 | Park et al. | |
| 11,051,304 B2 | 6/2021 | Lee et al. | |
| 11,277,819 B2 * | 3/2022 | Cao | ........ H04W 76/27 |
| 2017/0094656 A1 | 3/2017 | Chen et al. | |

(Continued)

FOREIGN PATENT DOCUMENTS

| | | |
|---|---|---|
| CN | 104581978 A | 4/2015 |
| EP | 3627924 A1 | 3/2020 |

(Continued)

OTHER PUBLICATIONS

International Search Report and Written Opinion—PCT/US2021/058443—ISA/EPO—dated Mar. 3, 2022.

(Continued)

*Primary Examiner* — Chuong A Ngo
(74) *Attorney, Agent, or Firm* — Holland & Hart LLP/Qualcomm Incorporated

(57) ABSTRACT

Methods, systems, and devices for wireless communications are described to support resource selection for a sidelink transmission based on a priority of available resources. A physical (PHY) layer of a user equipment (UE) may report different subsets of available resources to a medium access control (MAC) layer. Each subset may be associated with a different priority and the MAC layer may use the subsets to select a resource for the sidelink transmission. The MAC layer may additionally or alternatively maintain a list of UE identifiers (IDs) and may provide the list of the UE IDs to the PHY layer for resource identification. The PHY layer may use the list to implement different reference signal parameters for UEs associated with the list of UE IDs than for other UEs. The PHY layer may report the set of available resources to the MAC layer, based on the list of UE IDs.

78 Claims, 14 Drawing Sheets

(51) Int. Cl.
*H04L 43/16* (2022.01)
*H04W 80/02* (2009.01)

(56) References Cited

U.S. PATENT DOCUMENTS

| | | |
|---|---|---|
| 2018/0049084 A1 | 2/2018 | Lee et al. |
| 2018/0234973 A1 | 8/2018 | Lee et al. |
| 2019/0045389 A1 | 2/2019 | Belghoul et al. |
| 2020/0029340 A1 | 1/2020 | He et al. |
| 2020/0169984 A1 | 5/2020 | Lee et al. |
| 2020/0229171 A1 | 7/2020 | Khoryaev et al. |
| 2021/0058992 A1 | 2/2021 | Szil Gyi |
| 2021/0135928 A1 | 5/2021 | Yi et al. |
| 2021/0144736 A1 | 5/2021 | Li et al. |
| 2021/0176751 A1 | 6/2021 | Belleschi et al. |
| 2021/0235328 A1* | 7/2021 | Hui .................. H04W 72/0446 |
| 2022/0061095 A1 | 2/2022 | Xue et al. |
| 2022/0086855 A1 | 3/2022 | Mallick et al. |
| 2022/0174655 A1 | 6/2022 | Tsai et al. |
| 2022/0174690 A1 | 6/2022 | Wang et al. |

FOREIGN PATENT DOCUMENTS

| | | |
|---|---|---|
| WO | WO-2019195563 A1 | 10/2019 |
| WO | WO-2020011684 A1 | 1/2020 |

OTHER PUBLICATIONS

3GPP TS 38.212, "3rd Generation Partnership Project; Technical Specification Group Radio Access Network; NR; Multiplexing and Channel Coding (Release 16)", 3GPP TS 38.212, V16.3.0, Sep. 2020, Section 8, Valbonne, FR, 2020, 8 pages.

3GPP TS 38.213, "3rd Generation Partnership Project; Technical Specification Group Radio Access Network; NR; Physical Layer Procedures for Control (Release 16)", 3GPP TS 38.213, V16.3.0, Sep. 2020, Section 16, Valbonne, FR, 2020, 21 pages.

3GPP TS 38.214, "3rd Generation Partnership Project; Technical Specification Group Radio Access Network; NR; Physical Layer Procedures for Data (Release 16)", 3GPP TS 38.214, V16.3.0, Sep. 2020, Section 8, Valbonne, FR, 2020, 16 pages.

3GPP TS 38.321, "3rd Generation Partnership Project; Technical Specification Group Radio Access Network; NR; Medium Access Control (MAC) Protocol Specification (Release 16)", 3GPP TS 38.321, V16.2.1, Sep. 2020, Sections 5.22, 5.23 and 6.1.6, Valbonne, FR, 2020, 23 pages.

Lenovo., et al., "Sidelink Resource Allocation for Reliability Enhancement", 3GPP TSG RAN WG1 #103-e, 3GPP Draft R1-2008918, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), 5 Pages, XP051946730, Section: 2.1, p. 1-p. 4 section: 3, p. 5.

Oppo: "Inter-UE Coordination in Mode 2 of NR Sidelink", 3GPP Draft, R1-2009319, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 26, 2020 (Oct. 26, 2020), XP051947523, 8 Pages, paragraph [0002], figure 1, section: 2.1, p. 1-p. 2, paragraph [0002].

* cited by examiner

TECHNIQUES FOR SIDELINK RESOURCE SELECTION

INTRODUCTION

The following relates to wireless communications, and more specifically to managing sidelink resources.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first UE is described. The method may include receiving, at a first protocol stack layer of the first UE from a second protocol stack layer of the first UE, an indication of a set of parameters. The method may also include reporting, from a first protocol stack layer of the first UE to a the second protocol stack layer of the first UE, a set of resources available for a sidelink transmission for the first UE based on sidelink control information (SCI) and the set of parameters, the set of resources including one or more subsets of resources. The method may further include reporting, to the second protocol stack layer, an indication of each subset of the set of resources and receiving, from the second protocol stack layer, an indication of a resource of the set of resources for the sidelink transmission in response to reporting the indication of the one or more subsets of resources.

An apparatus for wireless communication at a first UE is described. The apparatus may include a processor and memory coupled to the processor. The processor and memory may be configured to receive, at a first protocol stack layer of the first UE from a second protocol stack layer of the first UE, an indication of a set of parameters. The processor and memory may further be configured to report, from a first protocol stack layer of the first UE to a the second protocol stack layer of the first UE, a set of resources available for a sidelink transmission for the first UE based on SCI and the set of parameters, the set of resources including one or more subsets of resources. The processor and memory may also be configured to report, to the second protocol stack layer, an indication of each subset of the set of resources and receive, from the second protocol stack layer, an indication of a resource of the set of resources for the sidelink transmission in response to reporting the indication of the one or more subsets of resources.

Another apparatus for wireless communication at a first UE is described. The apparatus may include means for receiving, at a first protocol stack layer of the first UE from a second protocol stack layer of the first UE, an indication of a set of parameters. The apparatus may also include means for reporting, from a first protocol stack layer of the first UE to a the second protocol stack layer of the first UE, a set of resources available for a sidelink transmission for the first UE based on SCI and the set of parameters, the set of resources including one or more subsets of resources. The apparatus may further include means for reporting, to the second protocol stack layer, an indication of each subset of the set of resources and means for receiving, from the second protocol stack layer, an indication of a resource of the set of resources for the sidelink transmission in response to reporting the indication of the one or more subsets of resources.

A non-transitory computer-readable medium storing code for wireless communication at a first UE is described. The code may include instructions executable by a processor to receive, at a first protocol stack layer of the first UE from a second protocol stack layer of the first UE, an indication of a set of parameters. The code may further be executable to report, from a first protocol stack layer of the first UE to a the second protocol stack layer of the first UE, a set of resources available for a sidelink transmission for the first UE based on SCI and the set of parameters, the set of resources including one or more subsets of resources. The code may also be executable to report, to the second protocol stack layer, an indication of each subset of the set of resources and receive, from the second protocol stack layer, an indication of a resource of the set of resources for the sidelink transmission in response to reporting the indication of the one or more subsets of resources.

Some examples of the method, apparatuses, and non-transitory computer-readable medium described herein may further include operations, features, means, or instructions for indicating, for each subset of the set of resources, a respective type of the subset of resources.

In some examples of the method, apparatuses, and non-transitory computer-readable medium described herein, a first subset of resources unassociated with SCI reserving resources for another sidelink transmission, a second subset of resources reserved by SCI corresponding to a reference signal received power (RSRP) measurement below a threshold, a third subset of resources associated with spatial reuse of resources and reserved by SCI corresponding to an RSRP measurement satisfying a threshold, and any combination thereof.

In some examples of the method, apparatuses, and non-transitory computer-readable medium described herein, a first group of resources for which the first UE fails to decode second SCI identifying a second UE associated with transmissions on the first group of resources and a second group of resources for which the first UE decodes second SCI that identifies a UE associated with transmissions on the second group of resources.

In some examples of the method, apparatuses, and non-transitory computer-readable medium described herein, reporting, to the second protocol stack layer, an indication of a respective transmit power constraint for each resource of the third subset of resources.

In some examples of the method, apparatuses, and non-transitory computer-readable medium described herein, reporting, to the second protocol stack layer, an identifier (ID) of a transmitting UE or a receiving UE, or both, associated with a resource of the set of resources.

Some examples of the method, apparatuses, and non-transitory computer-readable medium described herein may further include operations, features, means, or instructions for receiving, from the second protocol stack layer, an indication to report the ID of the transmitting UE, or the receiving UE, or both, the reporting the ID based on receiving the indication to report the ID.

Some examples of the method, apparatuses, and non-transitory computer-readable medium described herein may further include operations, features, means, or instructions for determining that a percentage of total resources associated with the set of resources fails to meet a threshold percentage and increasing an RSRP threshold for determining the set of resources, the reporting the set of resources based on increasing the RSRP threshold and the reporting the ID based on increasing the RSRP threshold.

Some examples of the method, apparatuses, and non-transitory computer-readable medium described herein may further include operations, features, means, or instructions for determining that an amount of resources of a first subset of the set of resources fails to meet a threshold, the first subset unassociated with SCI reserving resources for another sidelink transmission and the reporting the ID based on determining that the amount of resources of the first subset of the set of resources fails to meet the threshold.

Some examples of the method, apparatuses, and non-transitory computer-readable medium described herein may further include operations, features, means, or instructions for determining that an amount of resources of two or more subsets of the set of resources fails to meet a threshold, the reporting the ID based on determining that the amount of resources of the two or more subsets of the set of resources fails to meet the threshold.

A method for wireless communication at a first UE is described. The method may include providing, from a first protocol stack layer of the first UE to a second protocol stack layer of the first UE, an indication of a set of parameters. The method may also include receiving, at a first protocol stack layer of the first UE and from a the second protocol stack layer of the first UE, a report of a set of resources available for a sidelink transmission for the first UE, the set of resources including one or more subsets of resources. The method may further include receiving, from the second protocol stack layer, an indication of each subset of the set of resources and providing, to the second protocol stack layer, an indication of a resource of the set of resources for the sidelink transmission in response to receiving the indication of the one or more subsets of resources.

An apparatus for wireless communication at a first UE is described. The apparatus may include a processor and memory coupled to the processor. The memory and processor may be configured to provide, from a first protocol stack layer of the first UE to a second protocol stack layer of the first UE, an indication of a set of parameters. The memory and processor may further be configured to receive, at a first protocol stack layer of the first UE and from a the second protocol stack layer of the first UE, a report of a set of resources available for a sidelink transmission for the first UE, the set of resources including one or more subsets of resources. The memory and processor may also be configured to receive, from the second protocol stack layer, an indication of each subset of the set of resources and provide, to the second protocol stack layer, an indication of a resource of the set of resources for the sidelink transmission in response to receiving the indication of the one or more subsets of resources.

Another apparatus for wireless communication at a first UE is described. The apparatus may include means for providing, from a first protocol stack layer of the first UE to a second protocol stack layer of the first UE, an indication of a set of parameters. The apparatus may also include means for receiving, at a first protocol stack layer of the first UE and from a the second protocol stack layer of the first UE, a report of a set of resources available for a sidelink transmission for the first UE, the set of resources including one or more subsets of resources. The apparatus may further include means for receiving, from the second protocol stack layer, an indication of each subset of the set of resources and means for providing, to the second protocol stack layer, an indication of a resource of the set of resources for the sidelink transmission in response to receiving the indication of the one or more subsets of resources.

A non-transitory computer-readable medium storing code for wireless communication at a first UE is described. The code may include instructions executable by a processor to provide, from a first protocol stack layer of the first UE to a second protocol stack layer of the first UE, an indication of a set of parameters. The code may further be executable to receive, at a first protocol stack layer of the first UE and from a the second protocol stack layer of the first UE, a report of a set of resources available for a sidelink transmission for the first UE, the set of resources including one or more subsets of resources. The code may also be executable to receive, from the second protocol stack layer, an indication of each subset of the set of resources and provide, to the second protocol stack layer, an indication of a resource of the set of resources for the sidelink transmission in response to receiving the indication of the one or more subsets of resources.

Some examples of the method, apparatuses, and non-transitory computer-readable medium described herein may further include operations, features, means, or instructions for receiving, for each subset of the set of resources, an indication of a respective type of the subset of resources.

In some examples of the method, apparatuses, and non-transitory computer-readable medium described herein, a first subset of resources unassociated with SCI reserving resources for another sidelink transmission, a second subset of resources reserved by SCI corresponding to an RSRP measurement being below a threshold, a third subset of resources associated with spatial reuse of resources and reserved by SCI corresponding to an RSRP measurement satisfying a threshold, and any combination thereof.

In some examples of the method, apparatuses, and non-transitory computer-readable medium described herein, a first group of resources for which the first UE fails to decode second SCI identifying a second UE associated with transmissions on the first group of resources and a second group of resources for which the first UE decodes second SCI that identifies a UE associated with transmissions on the second group of resources.

Some examples of the method, apparatuses, and non-transitory computer-readable medium described herein may further include operations, features, means, or instructions for receiving, from the second protocol stack layer, an indication of a respective transmit power constraint for each resource of the third subset of resources.

Some examples of the method, apparatuses, and non-transitory computer-readable medium described herein may further include operations, features, means, or instructions for receiving, from the second protocol stack layer, an ID of a transmitting UE or a receiving UE, or both, associated with a resource of the set of resources.

Some examples of the method, apparatuses, and non-transitory computer-readable medium described herein may further include operations, features, means, or instructions for providing, to the second protocol stack layer, an indication to report the ID of the transmitting UE, or the receiving UE, or both, the receiving the ID based on providing the indication to report the ID.

Some examples of the method, apparatuses, and non-transitory computer-readable medium described herein may further include operations, features, means, or instructions for determining a respective probability for each subset of the one or more subsets and selecting the resource for the sidelink transmission from the set of resources based on the respective probability for the one or more subsets, the providing the indication of the resource for the sidelink transmission based on selecting the resource.

In some examples of the method, apparatuses, and non-transitory computer-readable medium described herein, the respective probability for the one or more subsets may be based on a traffic priority for the sidelink transmission, or a type of the one or more subsets, or an ID associated with a second UE, or a transmit power for the sidelink transmission, or a transmit power constraint, or a retransmission status of the sidelink transmission, or any combination thereof.

Some examples of the method, apparatuses, and non-transitory computer-readable medium described herein may further include operations, features, means, or instructions for selecting the resource for the sidelink transmission from the set of resources based on a sequence associated with the one or more subsets, the providing the indication of the resource for the sidelink transmission based on selecting the resource.

Some examples of the method, apparatuses, and non-transitory computer-readable medium described herein may further include operations, features, means, or instructions for selecting the resource for the sidelink transmission from a subset of the one or more subsets based on a priority of the sidelink transmission, the providing the indication of the resource for the sidelink transmission based on selecting the resource.

A method for wireless communication at a UE is described. The method may include receiving, at a first protocol stack layer of the first UE and from a second protocol stack layer of the first UE, an indication of a list of IDs associated with one or more second UEs. The method may further include reporting, to the second protocol stack layer, an indication of a set of resources available for a sidelink transmission for the first UE based on the list of IDs and SCI and receiving, from the second protocol stack layer, an indication of a resource of the set of resources for the sidelink transmission in response to reporting the indication of the set of resources.

An apparatus for wireless communication at a UE is described. The apparatus may include a processor and memory coupled to the processor. The processor and memory may be configured to receive, at a first protocol stack layer of the first UE and from a second protocol stack layer of the first UE, an indication of a list of IDs associated with one or more second UEs. The processor and memory may further be configured to report, to the second protocol stack layer, an indication of a set of resources available for a sidelink transmission for the first UE based on the list of IDs and SCI and receive, from the second protocol stack layer, an indication of a resource of the set of resources for the sidelink transmission in response to reporting the indication of the set of resources.

Another apparatus for wireless communication at a UE is described. The apparatus may include means for receiving, at a first protocol stack layer of the first UE and from a second protocol stack layer of the first UE, an indication of a list of IDs associated with one or more second UEs. The apparatus may further include means for reporting, to the second protocol stack layer, an indication of a set of resources available for a sidelink transmission for the first UE based on the list of IDs and SCI and means for receiving, from the second protocol stack layer, an indication of a resource of the set of resources for the sidelink transmission in response to reporting the indication of the set of resources.

A non-transitory computer-readable medium storing code for wireless communication at a UE is described. The code may include instructions executable by a processor to receive, at a first protocol stack layer of the first UE and from a second protocol stack layer of the first UE, an indication of a list of IDs associated with one or more second UEs. The code may further be executable to report, to the second protocol stack layer, an indication of a set of resources available for a sidelink transmission for the first UE based on the list of IDs and SCI and receive, from the second protocol stack layer, an indication of a resource of the set of resources for the sidelink transmission in response to reporting the indication of the set of resources.

Some examples of the method, apparatuses, and non-transitory computer-readable medium described herein may further include operations, features, means, or instructions for receiving first SCI indicating a scheduled sidelink transmission for a third UE and determining whether the third UE may be associated with an ID of the list of IDs based on receiving the first SCI.

Some examples of the method, apparatuses, and non-transitory computer-readable medium described herein may further include operations, features, means, or instructions for determining that the third UE may be associated with an ID of the list of IDs and comparing an RSRP associated with the first SCI with a first RSRP threshold corresponding to the list of IDs based on determining that the third UE may be associated with an ID of the list of IDs.

Some examples of the method, apparatuses, and non-transitory computer-readable medium described herein may further include operations, features, means, or instructions for determining that a percentage of total resources associated with the set of resources fails to meet a threshold percentage, increasing the first RSRP threshold by a first amount for determining the set of resources, the reporting the set of resources based on increasing the first RSRP threshold, and increasing a second RSRP threshold associated with one or more third UEs by the first amount for determining the set of resources, the reporting the set of resources based on increasing the second RSRP threshold.

Some examples of the method, apparatuses, and non-transitory computer-readable medium described herein may further include operations, features, means, or instructions for determining that a percentage of total resources associated with the set of resources fails to meet a threshold percentage, increasing the first RSRP threshold by a first amount for determining the set of resources, the reporting the set of resources based on increasing the first RSRP threshold, and increasing a second RSRP threshold associated with one or more third UEs by a second amount for determining the set of resources, the reporting the set of resources based on increasing the second RSRP threshold.

Some examples of the method, apparatuses, and non-transitory computer-readable medium described herein may further include operations, features, means, or instructions for receiving first SCI indicating a scheduled sidelink transmission for a second UE of the one or more second UEs and comparing an RSRP associated with the first SCI with a first RSRP threshold equal to a second RSRP threshold associated with one or more third UEs, the reporting the set of resources based on comparing the RSRP with the first RSRP threshold.

Some examples of the method, apparatuses, and non-transitory computer-readable medium described herein may further include operations, features, means, or instructions for determining that a percentage of total resources associated with the set of resources fails to meet a threshold percentage, increasing the first RSRP threshold by a first amount for determining the set of resources, the reporting the set of resources based on increasing the first RSRP threshold, and increasing the second RSRP threshold by a second amount for determining the set of resources, the reporting the set of resources based on increasing the second RSRP threshold.

A method for wireless communication at a first UE is described. The method may include providing, from a first protocol stack layer of the first UE to a second protocol stack layer of the first UE, an indication of a list of IDs associated with one or more second UEs. The method may also include receiving, from the second protocol stack layer, an indication of a set of resources available for a sidelink transmission for the first UE based on providing the list of IDs and providing, to the second protocol stack layer, an indication of a resource of the set of resources for the sidelink transmission in response to receiving the indication of the set of resources.

An apparatus for wireless communication at a first UE is described. The apparatus may include a processor and memory coupled to the processor. The processor and memory may be configured to provide, from a first protocol stack layer of the first UE to a second protocol stack layer of the first UE, an indication of a list of IDs associated with one or more second UEs. The processor and memory may further be configured to receive, from the second protocol stack layer, an indication of a set of resources available for a sidelink transmission for the first UE based on providing the list of IDs and provide, to the second protocol stack layer, an indication of a resource of the set of resources for the sidelink transmission in response to receiving the indication of the set of resources.

Another apparatus for wireless communication at a first UE is described. The apparatus may include means for providing, from a first protocol stack layer of the first UE to a second protocol stack layer of the first UE, an indication of a list of IDs associated with one or more second UEs. The apparatus may further include means for receiving, from the second protocol stack layer, an indication of a set of resources available for a sidelink transmission for the first UE based on providing the list of IDs and means for providing, to the second protocol stack layer, an indication of a resource of the set of resources for the sidelink transmission in response to receiving the indication of the set of resources.

A non-transitory computer-readable medium storing code for wireless communication at a first UE is described. The code may include instructions executable by a processor to provide, from a first protocol stack layer of the first UE to a second protocol stack layer of the first UE, an indication of a list of IDs associated with one or more second UEs. The code may further be executable to receive, from the second protocol stack layer, an indication of a set of resources available for a sidelink transmission for the first UE based on providing the list of IDs and provide, to the second protocol stack layer, an indication of a resource of the set of resources for the sidelink transmission in response to receiving the indication of the set of resources.

Some examples of the method, apparatuses, and non-transitory computer-readable medium described herein may further include operations, features, means, or instructions for determining the list of IDs based on communications with the one or more second UEs, the providing the indication of the list of IDs based on determining the list of IDs.

In some examples of the method, apparatuses, and non-transitory computer-readable medium described herein, the communications indicate group information including a speed or a velocity, or both, associated with the one or more second UEs.

In some examples of the method, apparatuses, and non-transitory computer-readable medium described herein, the one or more second UEs may be associated with a first RSRP threshold for determining the set of resources and one or more other UEs may be associated with a second RSRP threshold for determining the set of resources.

In some examples of the method, apparatuses, and non-transitory computer-readable medium described herein, the one or more second UEs may be associated with a first amount of an RSRP threshold increase for determining the set of resources and one or more other UEs may be associated with a second amount of an RSRP threshold increase for determining the set of resources.

DETAILED DESCRIPTION

Figure 1:
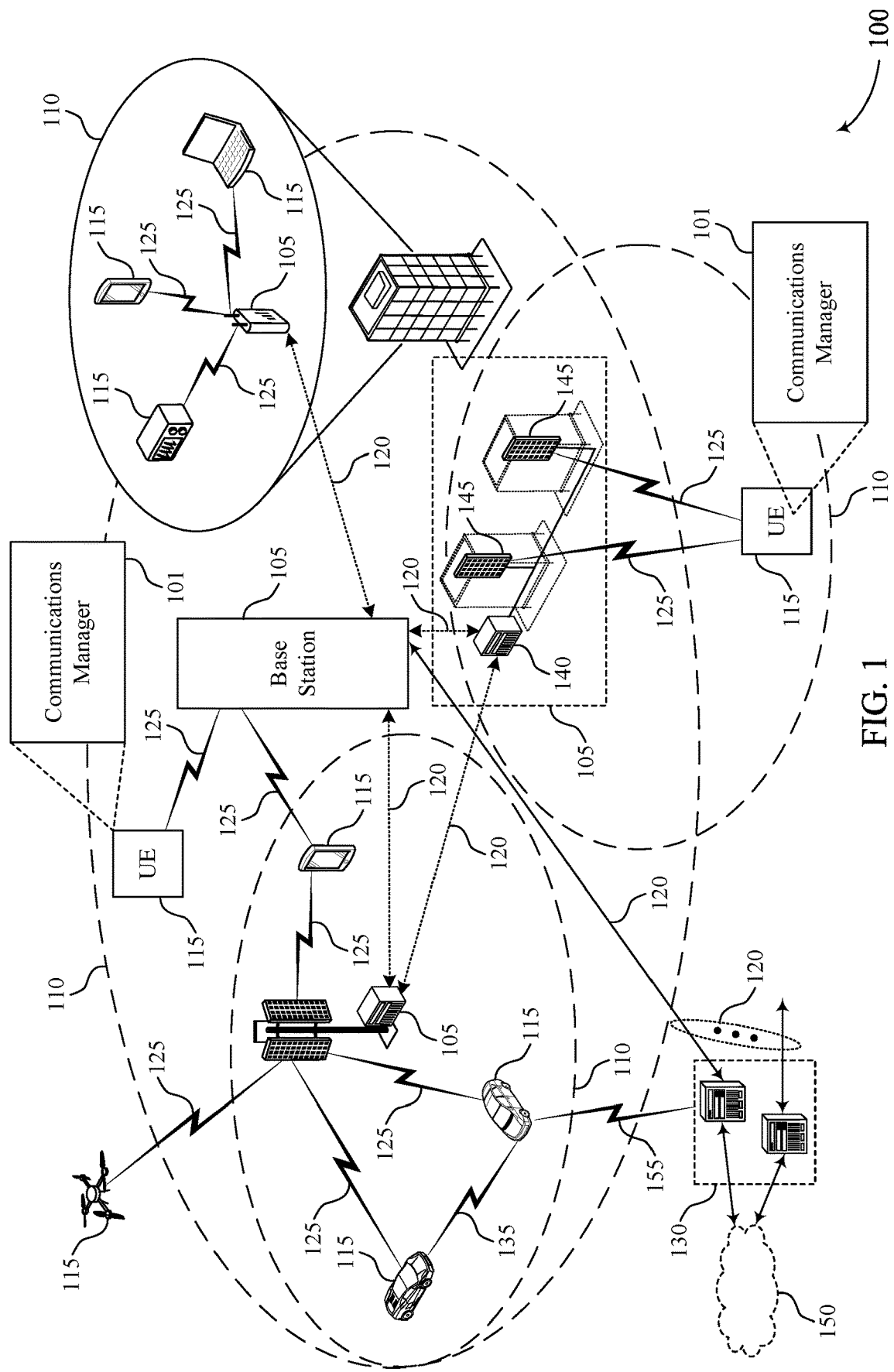
FIG. 1 illustrates an example of a wireless communications system that supports techniques for sidelink resource selection in accordance with one or more aspects of the present disclosure.

A wireless communications system may include multiple UEs which may communicate with each other using sidelink communications (e.g., communications between UEs, without communicating with a base station). The UEs may allocate resources (e.g., time and/or frequency resources) using an allocation mode based on UE selection of the resources (e.g., a mode 2 for sidelink resource allocation that excludes a base station from the resource selection process). For example, a UE may perform channel sensing (e.g., sidelink channel sensing) by decoding SCI (e.g., control information communicated via one or more sidelink channels) to identify unoccupied or available sidelink resources. The sensing may be performed by a physical (PHY) layer (e.g., a layer where transport channels may be mapped to physical channels) of a protocol stack of the UE, for example, by decoding scheduling information included in received SCI. The protocol stack may be used for communications in a packet-based network that operates according to a layered protocol stack at a UE, for example, where each layer of the protocol stack may perform one or more operations for the communications. Each SCI received by the UE may be broadcast by another UE and may indicate sidelink resources reserved by the respective UE. The UE (e.g., the PHY layer of the UE) may receive the SCI during a sensing window and may use the information included in the SCI to identify or determine available resources.

The PHY layer may determine unavailable resources (e.g., determine that resources are occupied) by decoding SCI and comparing an RSRP of the SCI to an RSRP threshold. If the RSRP of the SCI satisfies or exceeds the RSRP threshold, the resources reserved by the SCI may be considered unavailable resources (e.g., occupied resources). If the RSRP of the SCI fails to meet the RSRP threshold, the resources reserved by the SCI may be considered available resources (e.g., unoccupied resources). Resources not reserved by SCI may also be considered available. If a percentage of available resources does not meet a threshold percentage, the PHY layer may increase the RSRP thresholds associated with received SCI and may determine new available resources based on the increased RSRP thresholds.

Upon identifying or determining an amount of available resources that satisfies (e.g., meets or exceeds) the threshold percentage, the PHY layer may report the available resources (e.g., report a set of resources) to a medium access control (MAC) layer of the UE (e.g., a layer of the protocol stack for performing priority handling, multiplexing logical to transport channels, and performing error detection). The MAC layer may randomly select a resource for a sidelink transmission, with an equal probability of selecting any available resource, including unreserved resources and resources reserved by an SCI that does not meet the corresponding RSRP threshold. For example, the MAC layer may select a resource for the sidelink transmission without using information associated with UEs reserving resources, or without considering differences between available resources. In some cases, the UE may therefore randomly select a resource for the sidelink transmission that may result in lower communication quality (e.g., higher interference) than another available resource (e.g., the UE may randomly reuse a reserved resource that does not meet the RSRP threshold, but which may result in higher interference than another available resource).

The present disclosure provides techniques for performing resource selection for a sidelink transmission based on a priority for the available resources. In a first example, the PHY layer may report different subsets of the available resources to the MAC layer, which may include reporting a UE identifier (ID) associated with transmissions scheduled on available resources. Each subset may be associated with a different priority or selection probability, and the MAC layer may use the reported subsets to select a resource for the sidelink transmission. A first subset may include resources not reserved by a prior SCI. A second subset may include resources reserved by a prior SCI associated with an RSRP measurement that does not meet the RSRP threshold. A third subset may include resources reserved by a prior SCI associated with an RSRP measurement that satisfies the RSRP threshold, but for which spatial reuse is allowed.

The PHY layer may report the subsets of available resources to the MAC layer and the MAC layer may use the different subsets to select a resource for the sidelink transmission (e.g., a resource of the set of resources). For example, the MAC layer may randomly select the resource from across the subsets, with different probabilities applied to each resource subset or group. Additionally or alternatively, the MAC layer may select the resource from a subset based on a sequence for selecting from the different subsets, or based on a priority of the sidelink transmission and a priority of the different subsets.

In a second example, the MAC layer may maintain a list of UE IDs and may provide the list of the UE IDs to the PHY layer for resource identification. In some cases, the PHY layer may use the list of UE IDs to implement a different RSRP threshold for UEs associated with the list of UE IDs than for UEs not associated with the list of UE IDs. The PHY layer may additionally or alternatively use the list to implement different RSRP threshold increases for UEs associated with the list of UE IDs and UEs not associated with the list of UE IDs. The MAC layer may use the list of UE IDs to indicate UEs receiving a higher level of protection of reserved resources (e.g., a lower RSRP threshold), such as UEs with a higher expected amount of traffic or that are physically located closer to the UE. The PHY layer may report the set of available resources to the MAC layer, and the MAC layer may select (e.g., randomly select) a resource for the sidelink transmission using the set of available resources (e.g., may select a resource of the set of resources).

The examples described herein of identifying one or more subsets of resources and using a list of UE IDs may be implemented together, or may be implemented separately, without departing from the scope of the present disclosure. For example, the UE may use a list of UE IDs to identify available resources for the sidelink transmission and may also identify one or more subsets of the available resources. In any of the examples described herein, the MAC layer may notify the PHY layer of the selected resource for the sidelink transmission. The PHY layer may transmit an SCI scheduling or reserving the resource for the sidelink transmission, which may be groupcast or broadcast to one or more other UEs. Additionally, it is to be understood that while the examples herein describe a PHY layer and a MAC layer, the same examples or variations thereof may also apply to any other layers of a protocol stack without departing from the scope of the present disclosure.

Aspects of the disclosure are initially described in the context of wireless communications systems. Aspects of the disclosure are further illustrated by and described with reference to process flows, apparatus diagrams, system diagrams, and flowcharts that relate to techniques for sidelink resource selection.

FIG. 1 illustrates an example of a wireless communications system 100 that supports techniques for sidelink resource selection in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may operate using one or more frequency bands, for example, in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack, for example, at a UE 115 or a base station 105, or both. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the PHY layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, a PHY layer of a UE 115 (e.g., a UE 115 performing sidelink communications) may report different subsets of the available resources to a MAC layer of the UE 115, which may include reporting a UE ID associated with transmissions scheduled on available resources. Each subset may be associated with a different priority or selection probability, and the MAC layer may use the reported subsets to select a resource for the sidelink transmission. Additionally or alternatively, the MAC layer may maintain a list of UE IDs and may provide the list of the UE IDs to the PHY layer for resource identification. The MAC layer may use the list of UE IDs to indicate UEs 115 receiving a higher level of protection of reserved resources (e.g., a lower RSRP threshold), such as UEs 115 with a higher expected amount of traffic or that are physically located closer to the UE 115. The PHY layer may report the set of available resources to the MAC layer, and the MAC layer may select (e.g., randomly select) a resource for the sidelink transmission using the set of available resources.

In various examples, a communication manager 101 may be included in a UE 115 to support sidelink resource management (e.g., resource identification and selection). In some examples, a communication manager 101 may receive at a first protocol stack layer (e.g., PHY layer) of a first UE 115 from a second protocol stack layer (e.g., MAC layer) of the first UE 115, an indication of a set of parameters. The communication manager 101 may report, to the second protocol stack layer, a set of resources available for a sidelink transmission for the first UE 115 based on SCI and the set of parameters, the set of resources including one or more subsets of resources. The communication manager 101 may report to the second protocol stack layer, an indication of each subset of the set of resources, and may receive from the second protocol stack layer, an indication of a resource of the set of resources for the sidelink transmission in response to reporting the indication of the one or more subsets of resources.

Additionally or alternatively, the communication manager 101 may provide, from a first protocol stack layer (e.g., a MAC layer) of the first UE 115 to a second protocol stack layer (e.g., a PHY layer) of the first UE 115, an indication of a set of parameters. The communication manager 101 may receive, from the second protocol stack layer, a report of a set of resources available for a sidelink transmission for the first UE 115, the set of resources including one or more subsets of resources. The communication manager 101 may receive, from the second protocol stack layer, an indication of each subset of the set of resources and may provide, to the second protocol stack layer, an indication of a resource of the set of resources for the sidelink transmission in response to receiving the indication of the one or more subsets of resources.

Additionally or alternatively, the communication manager 101 may receive, at a first protocol stack layer (e.g., a PHY layer) of the first UE 115 and from a second protocol stack layer (e.g., a MAC layer) of the first UE 115, an indication of a list of IDs associated with one or more second UEs 115. The communication manager 101 may report, to the second protocol stack layer, an indication of a set of resources available for a sidelink transmission for the first UE based on the list of IDs and SCI. The communication manager 101 may receive, from the second protocol stack layer, an indication of a resource of the set of resources for the sidelink transmission in response to reporting the indication of the set of resources.

Additionally or alternatively, the communication manager 101 may provide, from a first protocol stack layer (e.g., a MAC layer) of the first UE 115 to a second protocol stack layer (e.g., a PHY layer) of the first UE 115, an indication of a list of IDs associated with one or more second UEs 115. The communication manager 101 may receive, from the second protocol stack layer, an indication of a set of resources available for a sidelink transmission for the first UE 115 based on providing the list of IDs. The communication manager 101 may provide, to the second protocol stack layer, an indication of a resource of the set of resources for the sidelink transmission in response to receiving the indication of the set of resources.

Figure 2:
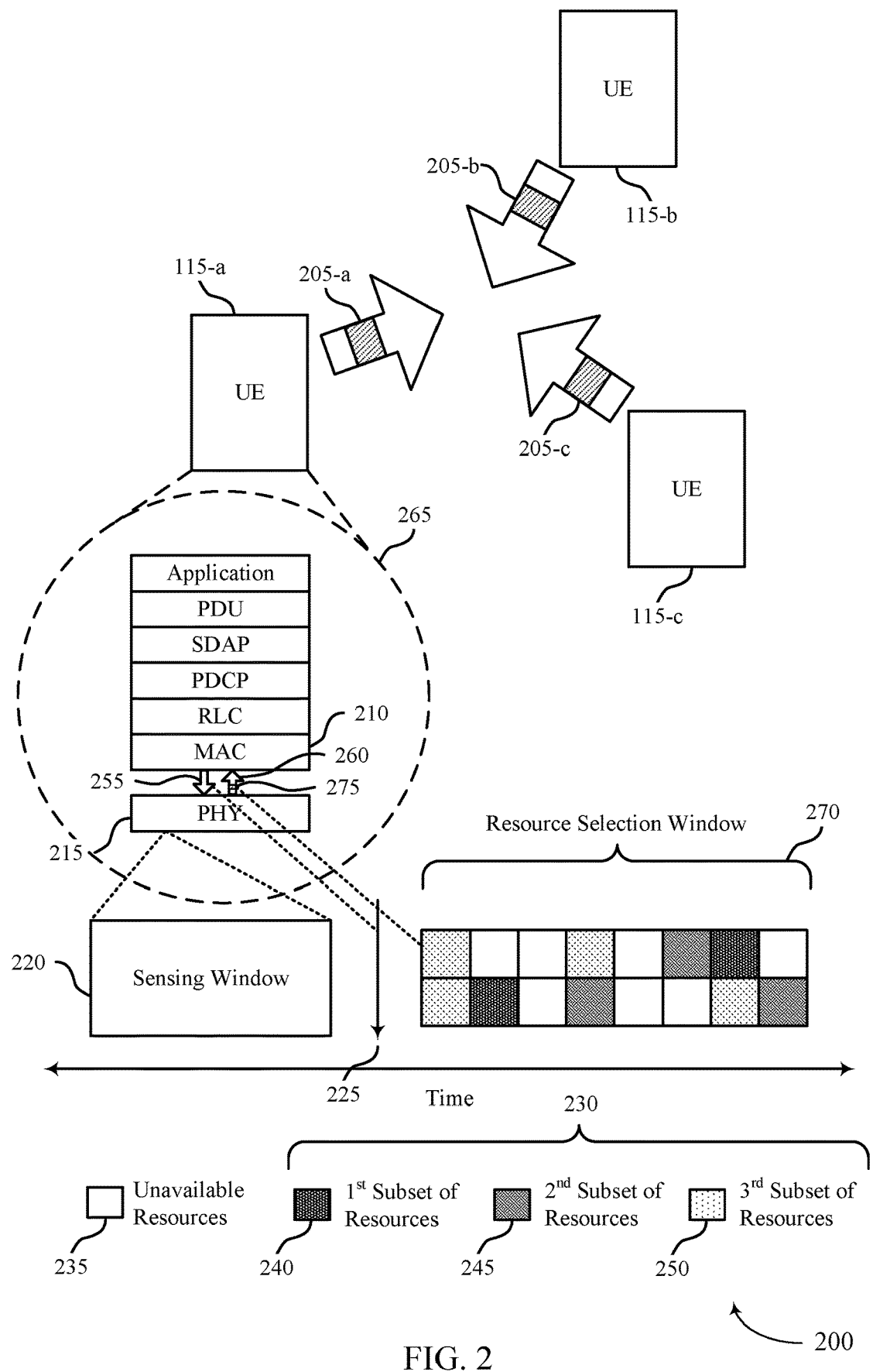
FIG. 2 illustrates an example of a wireless communications system that supports techniques for sidelink resource selection in accordance with one or more aspects of the present disclosure.

FIG. 2 illustrates an example of a wireless communications system 200 that supports techniques for sidelink resource selection in accordance with one or more aspects of the present disclosure. In some examples, wireless communications system 200 may implement aspects of wireless communications system 100. For example, wireless communications system 200 may include multiple UEs 115 which may represent examples of UEs 115 described with reference to FIG. 1. The multiple UEs 115 may include UEs 115-*a*, 115-*b*, and 115-*c*, which may communicate with each other or with other UEs 115 using sidelink communications. UEs 115-*a*, 115-*b*, and 115-*c* may allocate resources using an allocation mode based on UE selection of the resources (e.g., a mode 2 for sidelink resource allocation).

For example, UE 115-*a* (e.g., in addition to UEs 115-*b* and 115-*c*) may perform channel sensing (e.g., sidelink channel sensing) by decoding SCI 205 to identify unoccupied or available sidelink resources. The sensing may be performed by a first layer, such as a PHY layer 215, of a protocol stack 265 of UE 115-*a*, for example, by decoding scheduling information included in SCIs 205-*b* and 205-*c*, among other SCI 205. Each SCI 205 received by UE 115-*a* may be broadcast by a respective UE 115 (e.g., UE 115-*a* may broadcast SCI 205-*b*, and so forth) and may indicate sidelink resources reserved by the respective UE 115. UE 115-*a* (e.g., the PHY layer 215 of UE 115-*a*) may receive the SCI 205 during a sensing window 220 and may use the information included in the SCI 205 to identify or determine available resources.

The PHY layer 215 may obtain parameters for performing the channel sensing from a higher protocol stack layer (e.g., second layer) of UE 115-*a*, such as a MAC layer 210 of the protocol stack 265. It is to be understood that while the examples herein describe a PHY layer 215 and a MAC layer 210, the same examples may also apply to any other layers of a protocol stack 265 without departing from the scope of the present disclosure. For example, the examples described herein may apply to a PHY layer 215 and an RRC layer, or to a MAC layer 210 and an RRC layer, among other examples. In some cases, for example, a MAC layer 210 may receive information from or report information to other upper layers, such as the RRC layer, which may impact resource selection.

The MAC layer 210 may trigger selection of resources for a sidelink transmission and may, for example, provide a trigger 225 to the PHY layer 215 (e.g., via communications 255) for the PHY layer 215 to report a resource schedule for a resource selection window 270. The MAC layer 210 may also provide, to the PHY layer 215 (e.g., via communications 255), an indication of a sidelink resource pool for resource selection, a priority of the sidelink transmission (e.g., a layer 1 (L1) priority), a packet delay budget for the sidelink transmission, a number of subchannels for a data channel (e.g., physical sidelink shared channel (PSSCH)) or for a control channel (e.g., physical sidelink control channel (PSCCH)) associated with the sidelink transmission, a resource reservation interval for periodic resource reservation, a threshold percentage of available resources to report (e.g., SL-xPercentage), or a length of the sensing window 220, among other examples. The PHY layer 215 may perform channel sensing to identify available resources based on the parameters indicated by the MAC layer 210.

When performing sensing to identify available resources, the PHY layer 215 may determine unavailable resources 235 (e.g., determine that resources are occupied) by decoding SCI 205 (e.g., an SCI-1) and comparing an RSRP of the SCI 205 (e.g., or an RSRP of an associated data channel, such as a physical sidelink shared channel (PSSCH)) to an RSRP threshold. The RSRP threshold may be based on a priority of the sidelink transmission and a priority associated with the SCI 205, among other examples. If the RSRP of the SCI (e.g., or PSSCH) 205 satisfies or exceeds the RSRP threshold, the resources reserved by the SCI 205 may be considered unavailable resources 235 (e.g., occupied resources). If the RSRP of the SCI 205 (e.g., or the PSSCH) fails to meet the RSRP threshold, the resources reserved by the SCI 205 may be considered available resources (e.g., unoccupied resources, as represented by resource subsets 240, 245, and 250). Resources not reserved by SCI 205 may also be considered available.

Based on the determination of the available resources, the PHY layer 215 may also determine a percentage of resources within the resource selection window 270 that are available (e.g., SL-xPercentage). If the percentage of available resources does not meet the threshold percentage provided by the MAC layer 210 (e.g., SL-xPercentage), the PHY layer 215 may increase the RSRP thresholds associated with the received SCI 205 (e.g., may increase each threshold by 3 decibels (dB)) and may determine new available resources in the resource selection window 270 based on the increased RSRP thresholds. If the percentage of available resources still does not meet the threshold percentage provided by the MAC layer 210 (e.g., SL-xPercentage), PHY layer 215 may further increase the RSRP thresholds (e.g., by 3 dB), and may repeat this process until meeting the threshold percentage for the available resources.

Upon identifying or determining an amount of available resources that satisfies (e.g., meets or exceeds) the threshold percentage, the PHY layer 215 may report the available resources (e.g., report a set of resources 230) to the MAC layer 210 (e.g., via communications 260). The MAC layer 210 may create a sidelink grant (e.g., may reserve sidelink resources for the sidelink transmission) based on the report of the available resources from the PHY layer 215. For example, the MAC layer 210 may randomly select resources from the available resources for an initial transmission of the sidelink transmission and for retransmissions of the sidelink transmission. The MAC layer 210 may select the resources for the sidelink transmission such that the resources may be addressed by a time domain resource allocation (TDRA) field and a frequency domain resource allocation (FDRA) field of an SCI 205 (e.g., SCI 205-*a*). The MAC layer 210 may also select the resources such that a time gap (e.g., a defined time gap, such as a minimum time gap) exists between retransmissions for HARQ processes (e.g., if HARQ is enabled). For periodic transmissions, the MAC layer 210 may also trigger reselection of periodic resources, for example, based on expiration of a timer or based on reaching a count value with a counter.

The MAC layer 210 may provide the selected resource (e.g., a resource grant) to the PHY layer 215 (e.g., via communications 255). The PHY layer may transmit SCI 205, such as SCI 205-*a*, that may schedule or reserved the selected resource.

When selecting resources for the sidelink transmission randomly, the MAC layer 210 may have an equal probability of selecting any available resources, which may include unreserved resources and resources reserved by an SCI 205 that does not meet the corresponding RSRP threshold. For example, the MAC layer 210 may select a resource for the sidelink transmission without using information (e.g., transmission or reception information, such as identifiers (IDs)) associated with UEs 115 reserving resources within the resource selection window 270, or without considering differences between available resources. In some cases, UE 115-*a* may therefore randomly select a resource for the sidelink transmission that may result in lower communication quality (e.g., higher interference) than another available resource (e.g., UE 115-*a* may randomly reuse a reserved resource that does not meet the RSRP threshold, but which may result in higher interference than another available resource).

The present disclosure provides techniques for performing resource selection for a sidelink transmission based on a priority for the available resources (e.g., the set of resources 230). In a first example, the PHY layer 215 may report different subsets of the available resources to the MAC layer 210 (e.g., subsets 240, 245, and 250), which may include reporting a UE ID 275 associated with transmissions scheduled on resources that are available for reuse. Each subset may be associated with a different priority or selection probability, and the MAC layer 210 may use the reported subsets to select a resource for the sidelink transmission. In a second example, the MAC layer 210 may maintain a list of UE IDs 275 and may provide the list of the UE IDs 275 to the PHY layer 215. The PHY layer 215 may use the list of UE IDs 275 to implement a different RSRP threshold for UEs 115 associated with the list of UE IDs 275 than for UEs 115 not associated with the list of UE IDs 275. The PHY layer 215 may additionally or alternatively use the list to implement different RSRP threshold increases for UEs 115 associated with the list of UE IDs 275 and UEs 115 not associated with the list of UE IDs 275.

In the first example, the PHY layer 215 may report the different subsets of the available resources (e.g., set of resources 230) to the MAC layer, for example, based on a type of the available resources. A first subset 240 may include resources not reserved by a prior SCI 205. A second subset 245 may include resources reserved by a prior SCI 205 (e.g., SCI 205-b or 205-c) associated with an RSRP measurement that does not meet the RSRP threshold (e.g., that passed an RSRP measurement or comparison). The second subset 245 may include other subsets or groups of resources, such as a first group of resources for which a second SCI 205 (e.g., an SCI-2 including UE ID information) was undecodable and no UE IDs 275 were obtained and a second group of resources for which the second SCI 205 was decodable and UE IDs 275 (e.g., a transmit ID and a receive ID) were obtained. A third subset 250 may include resources reserved by a prior SCI 205 (e.g., SCI 205-b or 205-c) associated with an RSRP measurement that satisfies the RSRP threshold (e.g., that failed an RSRP measurement or comparison), but for which spatial reuse is allowed.

The PHY layer 215 may also report a transmitting UE ID 275 or a receiving UE ID 275, or both, to the MAC layer 210 for resources in the second subset and the third subset. In some cases, the PHY layer 215 may always report the UE ID(s) 275 to the MAC layer 210, and in some other cases, the PHY layer 215 may report the UE ID(s) 275 to the MAC layer 210 based on a condition. For example, the PHY layer 215 may report the UE ID(s) 275 to the MAC layer 210 if the RSRP threshold was increased when determining the available resources or if an amount of resources in the first subset is less than a threshold amount, or both.

The PHY layer 215 may report the subsets of available resources to the MAC layer 210 and the MAC layer 210 may use the different subsets to select a resource for the sidelink transmission. For example, the MAC layer 210 may randomly select the resource from across the subsets, with different probabilities applied to each resource subset or group. Additionally or alternatively, the MAC layer 210 may select the resource from a subset based on a sequence for selecting from the different subsets, or based on a priority of the sidelink transmission and a priority of the different subsets.

In the second example, the list of UE IDs 275 provided from the MAC layer 210 to the PHY layer 215 may be based on a configuration by another protocol stack layer (e.g., an application layer or another higher layer) or based on a data exchange record or communications between UE 115-a and one or more other UEs 115 (e.g., UEs 115-b and 115-c). The MAC layer 210 may use the list of UE IDs 275 to indicate UEs 115 receiving a higher level of protection of reserved resources (e.g., a lower RSRP threshold), such as UEs 115 with a higher expected amount of traffic or that are physically located closer to UE 115-a. Such information may be received by UE 115-a via group information (e.g., groupcast information), among other examples.

The MAC layer 210 may update the list of UE IDs 275 periodically, for example, based on data exchange (e.g., communications) with the one or more other UEs 115 (e.g., UEs 115-b and 115-c). The MAC layer 210 may provide the list to the PHY layer 215, and the PHY layer 215 may use the list to determine the available resources (e.g., the set of resources 230) for the sidelink transmission. For example, the PHY layer 215 may apply a different RSRP threshold to UEs 115 associated with the list of UE IDs 275 than to other UEs 115, or may apply a different increase in the RSRP threshold to UEs 115 associated with the list of UE IDs 275 than to other UEs 115, or both. The PHY layer 215 may report the set of available resources to the MAC layer 210, and the MAC layer 210 may select (e.g., randomly select) a resource for the sidelink transmission using the set of available resources.

The examples described herein of identifying one or more subsets of resources and using a list of UE IDs 275 may be implemented together, or may be implemented separately, without departing from the scope of the present disclosure. For example, UE 115-a may use a list of UE IDs 275 to identify available resources for the sidelink transmission and may also identify one or more subsets of the available resources.

In any of the examples described herein, the MAC layer 210 may notify the PHY layer 215 of the selected resource for the sidelink transmission (e.g., via communications 255). The PHY layer may transmit an SCI 205 (e.g., SCI 205-a) scheduling or reserving the resource for the sidelink transmission, which may be groupcast or broadcast to one or more other UEs 115 (e.g., UEs 115-b and 115-c).

Figure 3:
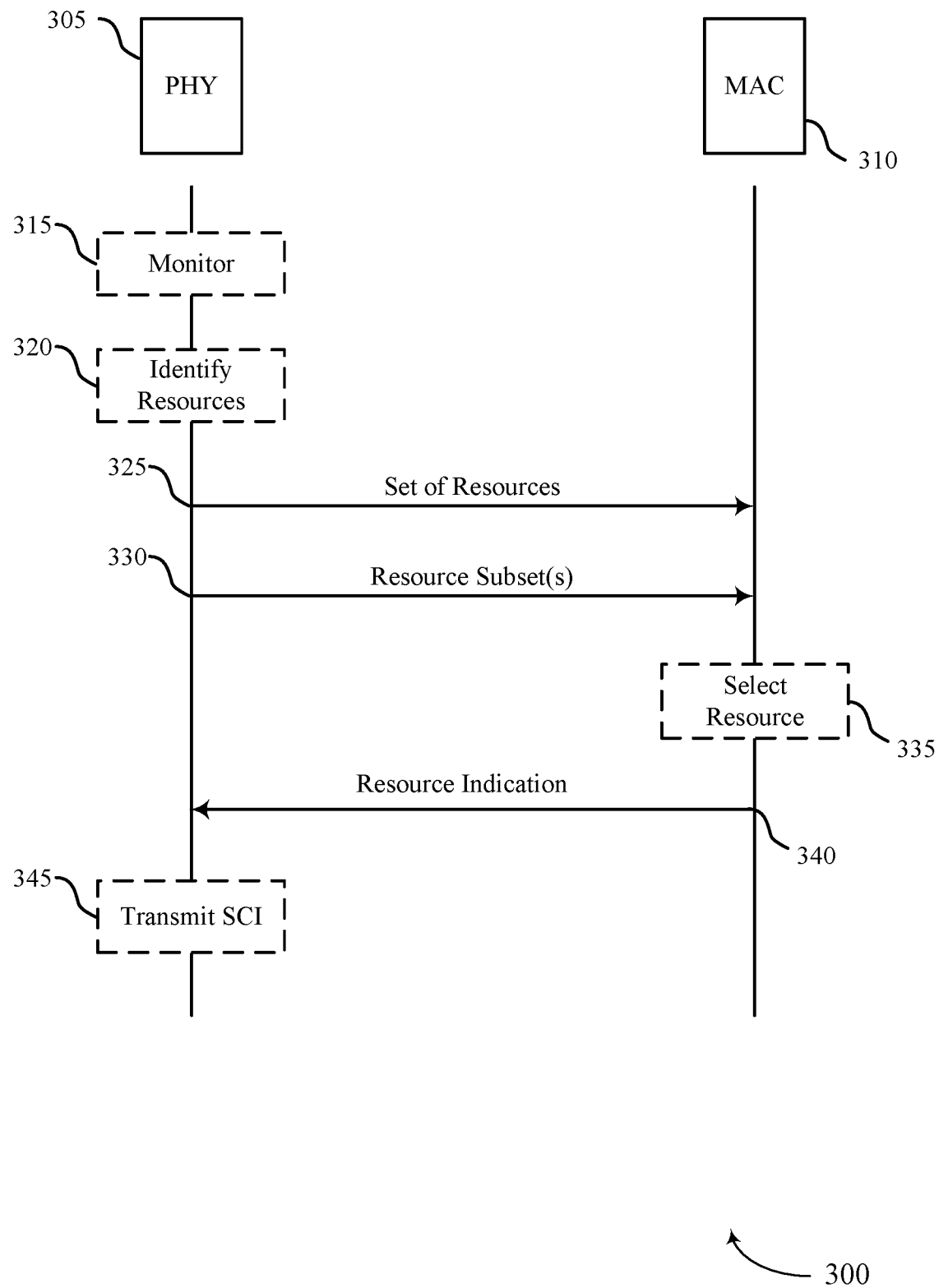
FIG. 3 illustrates an example of a process flow that supports techniques for sidelink resource selection in accordance with one or more aspects of the present disclosure.

FIG. 3 illustrates an example of a process flow 300 that supports techniques for sidelink resource selection in accordance with one or more aspects of the present disclosure. In some examples, process flow 300 may implement or be implemented by aspects of wireless communications system 100 or 200. For example, process flow 300 may be implemented by a PHY layer 305 and a MAC layer 310 of a UE 115, which may represent examples of a PHY layer, a MAC layer, and a UE 115 as described with reference to FIGS. 1 and 2. Process flow 300 may be implemented by the UE 115 (e.g., the PHY layer 305 and the MAC layer 310 of the UE 115), for example, to select a resource for a sidelink transmission using one or more subsets of resources available for the sidelink transmission, as described with reference to FIG. 2.

In the following description of process flow 300, the operations may be performed (e.g., reported or provided) in a different order than the order shown, or the operations performed by the UE 115 (e.g., by the PHY layer 305 and the MAC layer 310) may be performed in different orders or at different times. For example, specific operations may also be left out of process flow 300, or other operations may be added to process flow 300. Although the PHY layer 305 and the MAC layer 310 of the UE 115 are shown performing the operations of process flow 300, some aspects of some operations may also be performed by one or more other protocol stack layers of the UE 115 or by one or more other wireless devices.

At 315, the PHY layer 305 may monitor for SCI transmitted by other UEs 115 (e.g., one or more other UEs 115). For example, as described with reference to FIG. 2, the PHY layer may monitor, in a sensing window, for SCI that indicates reserved sidelink resources for the one or more other UEs 115. The SCI may include an SCI-1 message, which may indicate reserved sidelink resources and a priority of an associated communication. The SCI may also include an SCI-2 message, which may be associated with the SCI-1 message and may indicate a transmitting UE ID and a receiving UE ID for the reserved resources.

In some cases, the PHY layer 305 may receive SCI (e.g., SCI-1 and SCI-2) based on monitoring for the SCI and may identify reserved sidelink resources and associated UE ID(s) based on receiving the SCI. The PHY layer 305 may measure an RSRP associated with the received SCI (e.g., SCI-1). In some cases, the PHY layer 305 may receive and decode SCI-1 but may fail to receive or decode SCI-2, such that the PHY layer 305 may identify reserved sidelink resources but may fail to identify a UE ID associated with the reserved resources.

At 320, the PHY layer 305 may identify a set of resources available for a sidelink transmission for the UE 115 (e.g., in response to a trigger from the MAC layer 310). For example, the PHY layer 305 may identify resources unreserved by SCI and resources reserved by SCI associated with an RSRP that does not meet an RSRP threshold. In some cases, the RSRP threshold may be increased based on a percentage of available resources not meeting a threshold percentage. For example, the PHY layer 305 may determine that the percentage of available resource does not meet a threshold percentage and may increase an RSRP threshold for the SCI (e.g., for one or more SCI). The PHY layer 305 may also identify the set of resources based on one or more parameters for selecting resources (e.g., a set of parameters) received from the MAC layer 310 (e.g., prior to identifying the resources).

The set of resources may include one or more subsets of resources, and the PHY layer 305 may identify the one or more subsets. A first subset of resources may include resources not reserved by a prior SCI (e.g., by a received SCI) such that the first subset of resources may not be associated with a UE ID. A second subset of resources may include resources reserved by a prior SCI (e.g., by a received SCI, such as an SCI-1 or an SCI-1 and an SCI-2) associated with an RSRP that does not meet the RSRP threshold (e.g., an RSRP that passes a measurement or comparison). The second subset may also include different groups of resources. For example, the second subset may include a first group of resources for which an associated SCI-2 was undecodable (e.g., not decoded) and no UE IDs were obtained, as well as a second group of resources for which an associated SCI-2 was decodable (e.g., was decoded) and a transmitting UE ID and a receiving UE ID were obtained.

A third subset of resources may include resources reserved by a prior SCI (e.g., by a received SCI) associated with an RSRP that satisfies the RSRP threshold (e.g., an RSRP that fails a measurement or comparison), but for which spatial reuse of resources may be allowed. The spatial reuse of the resources of the third subset may be associated with a respective transmit power constraint or limit, such that the UE 115 may transmit the sidelink transmission according to the transmit power constraint if using a resource of the third subset. The PHY layer 305 may identify (e.g., calculate) a respective transmit power constraint for each resource of the third subset, for example, based on an associated RSRP measurement and one or more spatial reuse parameters for the respective resource.

In some cases, the first subset of resources may be associated with a higher priority of resources for the sidelink transmission, for example, based on the resources of the first subset being unreserved (e.g., and being below the RSRP threshold). Similarly, resources of the second and third subsets associated with a UE ID (e.g., a transmitting UE ID and/or a receiving UE ID) that may be unknown or undecodable to the UE 115 may be associated with a medium priority of resources for the sidelink transmission. Additionally, resources of the second and third subsets associated with a UE ID (e.g., a transmitting UE ID and/or a receiving UE ID) that may be known (e.g., and decodable) to the UE 115 may be associated with a lower priority of resources for the sidelink transmission, for example, based on a higher likelihood of causing interference for the sidelink transmission.

At 325, the PHY layer 305 may report, to the MAC layer 310, the set of resources available for the sidelink transmission. For example, the PHY layer 305 may report the set of resources to the MAC layer 310 according to one or more communication or other protocols associated with the protocol stack of the UE 115.

At 330, the PHY layer 305 may report, to the MAC layer 310, an indication of each subset of the set of resources. The PHY layer 305 may report, for example, a respective type of each subset of resources (e.g., a subset ID or a subset priority). In some cases, the indication may include an indication of the set of resources and of each subset of the set of resources (e.g., the actions of 325 and 330 may be performed at least partially simultaneously or as part of a same communication). Along with the indication of each subset, the PHY layer 305 may report a respective transmit power constraint or transmit power limit for each resource of the third subset as described herein.

The PHY layer 305 may also report, to the MAC layer 310, one or more UE IDs (e.g., transmitting and/or receiving UE IDs) with the indication of each subset. In some cases, the PHY layer 305 may report the transmitting UE ID, or the receiving UE ID, or both. In some cases, the MAC layer 310 may indicate for the PHY layer 305 whether to report the transmitting UE ID, or the receiving UE ID, or both (e.g., via one or more parameters indicated by the MAC layer 310 for the resource sensing). A transmitting UE ID may be used by the MAC layer 310 to protect or unprotect resources reserved for the transmitting UE ID and a receiving UE ID may be used by the MAC layer 310 to protect or unprotect resources reserved for the receiving UE ID. The one or more UE IDs may be associated, for example, with resources of the second group of the second subset and with resources of the third subset. In a first example, the PHY layer 305 may always report the UE ID(s) to the MAC layer 310.

In a second example, the PHY layer 305 may report the UE ID(s) to the MAC layer 310 if the PHY layer 305 increased the RSRP threshold to determine the set of available resources. For example, the PHY layer 305 may determine that the percentage of available resources fails to meet a threshold percentage and may increase the RSRP threshold to determine the set of available resources. Based on increasing the RSRP threshold, the PHY layer 305 may report the UE ID(s) (e.g., any known UE ID(s) associated with the second or third subset) to the MAC layer 310. For example, increasing the RSRP threshold may indicate a lower amount of unoccupied resources and reporting the UE ID(s) may increase a probability of selecting a resource associated with a higher communication quality. In some cases where the PHY layer 305 does not increase the RSRP threshold (e.g., if a default RSRP threshold results in obtaining a percentage of available resources that satisfies or exceeds the threshold percentage) the PHY layer 305 may refrain from reporting the UE ID(s).

In a third example, the PHY layer 305 may report the UE ID(s) if an amount of resources in one or more subsets (e.g., in the first subset) fails to meet a threshold amount (e.g., a stored or a configured amount). For example, the PHY layer 305 may determine that an amount of resources in the first subset fail to meet a threshold amount or may determine that a percentage of the set of resources represented by the first subset fails to meet a threshold percentage. In another example, the PHY layer 305 may determine that an amount of resources in the first subset and the second subset combined fail to meet a threshold amount or may determine that a percentage of the set of resources represented by the first subset and the second subset combined fails to meet a threshold percentage. The PHY layer 305 may report the UE ID(s) to the MAC layer 310 based on the determining. In other cases where the amount of resources or the percentage of resources of the one or more subsets satisfies or exceeds a corresponding threshold, the PHY layer may refrain from reporting the UE ID(s).

In a fourth example, which may represent a combination of the second and third examples, the PHY layer 305 may report the UE ID(s) to the MAC layer 310 if the RSRP threshold is increased and if the first subset of resources fails to meet a corresponding threshold. In other cases where the first subset of resources satisfies or exceeds the corresponding threshold, or where the PHY layer 305 refrains from increasing the RSRP threshold, the PHY layer may also refrain from reporting the UE ID(s).

At 335, the MAC layer 310 may select a resource (e.g., one or more resources) for the sidelink transmission based on the indicated set of resources and corresponding subset(s). In a first example, the MAC layer 310 may randomly select the resource from across all resource subsets. In a second example, the MAC layer 310 may quasi-randomly select the resource from across all resource sets, with a different probability of selection assigned to each subset. In some cases, different probabilities may also be assigned to the different groups of resources of the second subset (e.g., or to other groups within other subsets). In some cases, the probability assigned to each subset may be based on a priority of the traffic associated with the sidelink transmission.

In some cases, the probability assigned to each subset may be based on different priorities for different subsets (e.g., based on expected interference associated with a subset). For example, in order to prioritize the first subset, or the first group of the second subset, the MAC layer 310 may assign a higher probability of selection to the first subset or the first group. In a similar example, in order to de-prioritize the second group of the second subset, the MAC layer 310 may assign a lower probability of selection to the second group. In some cases, the MAC layer 310 may de-prioritize some resources of the second group (e.g., resources associated with UE IDs that are known to the UE 115) and may refrain from de-prioritizing other resources of the second group. In some cases, the MAC layer 310 may prioritize or de-prioritize some resources of the third subset based on a comparison of a transmit power limit with an intended transmit power for the sidelink transmission (e.g., based on a difference between the transmit power limit and the intended transmit power). For example, the MAC layer 310 may assign a lower probability to resources of the third subset associated with a transmit power limit lower than the intended transmit power.

In a third example, the MAC layer 310 may select a resource subset for resource selection and may select the resource for the sidelink transmission randomly from the selected resource subset. In some cases, the MAC layer 310 may select the resource subset based on a defined sequence. For example, the MAC layer 310 may select resources for an initial transmission from the first subset, then resources for a retransmission from the first group of the second subset, then from the second group of the second subset, sequentially. In another example of sequential selection, the MAC layer 310 may select resources for an initial transmission from the first subset, then resources for a retransmission from the first group of the second subset, then from the third subset, sequentially. In some cases, the MAC layer 310 may select the resource subset based on a priority of the sidelink transmission (e.g., which may be based on whether the sidelink transmission is a retransmission). For example, the MAC layer 310 may select the first subset for a higher priority transmission, the second subset for a medium priority transmission, or the third subset or the second group of the second subset for a lower priority transmission.

At 340, the MAC layer 310 may provide, to the PHY layer 305, an indication of the resource for the sidelink transmission. For example, the MAC layer 310 may provide an indication of the resource to the PHY layer 305 according to one or more communication or other protocols associated with the protocol stack of the UE 115.

At 345, the PHY layer 305 may transmit an SCI based on the resource indicated by the MAC layer 310. For example, the SCI may include a grant or other indication reserving the resource for the sidelink transmission and the PHY layer 305 may transmit the SCI in a broadcast or groupcast manner to indicate the reservation to one or more other UEs 115.

Figure 4:
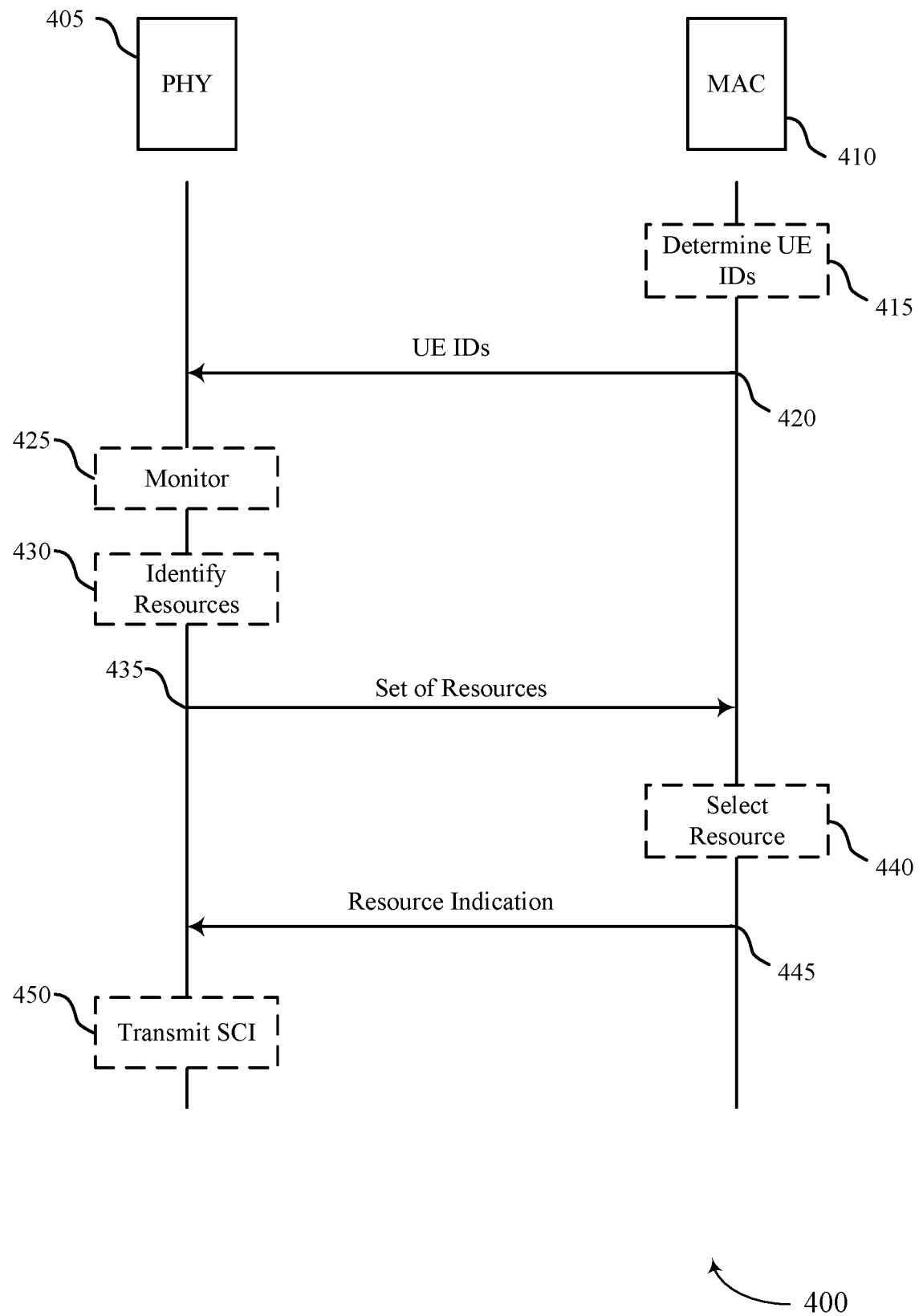
FIG. 4 illustrates an example of a process flow that supports techniques for sidelink resource selection in accordance with one or more aspects of the present disclosure.

FIG. 4 illustrates an example of a process flow 400 that supports techniques for sidelink resource selection in accordance with one or more aspects of the present disclosure. In some examples, process flow 400 may implement or be implemented by aspects of wireless communications system 100 or 200. Process flow 400 may be implemented by a PHY layer 405 and a MAC layer 410 of a UE 115, which may represent examples of a PHY layer, a MAC layer, and a UE 115 as described with reference to FIGS. 1-3. Process flow 400 may be implemented by the UE 115 (e.g., the PHY layer 405 and the MAC layer 410 of the UE 115), for example, to select a resource for a sidelink transmission using a list of UE IDs, as described with reference to FIG. 2.

In the following description of process flow 400, the operations may be performed (e.g., reported or provided) in a different order than the order shown, or the operations performed by the UE 115 (e.g., by the PHY layer 405 and the MAC layer 410) may be performed in different orders or at different times. For example, specific operations may also be left out of process flow 400, or other operations may be added to process flow 400. Although the PHY layer 405 and the MAC layer 410 of the UE 115 are shown performing the operations of process flow 400, some aspects of some operations may also be performed by one or more other protocol stack layers of the UE 115 or by one or more other wireless devices.

At 415, the MAC layer 410 may determine a list of UE IDs (e.g., one or more UE IDs) for the resource identification (e.g., resource exclusion) process performed by the PHY layer 405. For example, the MAC layer 410 may determine the list of UE IDs based on a data exchange record between the UE 115 and one or more other UEs 115. The data exchange record may include communications (e.g., sidelink communications) between the UE 115 and the one or more other UEs 115, and in some cases, may be within a defined time window (e.g., as configured or stored at the UE 115). Additionally or alternatively, the MAC layer 410 may determine the list of UE IDs based on signaling or a configuration from another protocol stack layer (e.g., a higher layer, such as an application layer).

In some cases, the MAC layer 410 may add a UE ID to the list if a time below a threshold has passed since a communication between the UE 115 and a UE 115 associated with the UE ID, for example, if the communication occurs within the time window. In some cases, the MAC layer 410 may remove a UE ID from the list if a time greater than a threshold has passed since a communication between the UE 115 and a UE 115 associated with the UE ID, for example, if the communication occurs outside of the time window. In some cases, the communications may include group or groupcast information for upper layers of the protocol stack of the UE 115, where the group information may include velocity, speed, positional, or traffic data associated with a UE ID. Based on the group information, the MAC layer 410 may add or remove UE ID(s) from the list, for example, based on a higher or lower expected amount of traffic from an associated UE 115. In some cases, the upper layers of the protocol stack of the UE 115 (e.g., higher than the MAC layer 410) may also instruct or indicate which UE ID(s) to add or remove from the list, for example, based on group or other information.

At 420, the MAC layer 410 may provide, to the PHY layer 405, the list of UE IDs based on determining the list. For example, the MAC layer 410 may provide the list to the PHY layer 305 according to one or more communication or other protocols associated with the protocol stack of the UE 115.

At 425, the PHY layer 405 may monitor for SCI transmitted by other UEs 115 (e.g., one or more other UEs 115). For example, as described with reference to FIG. 2, the PHY layer may monitor, in a sensing window, for SCI that indicates reserved sidelink resources for the one or more other UEs 115. The SCI may include an SCI-1 message, which may indicate reserved sidelink resources and a priority of an associated communication. The SCI may also include an SCI-2 message, which may be associated with the SCI-1 message and may indicate a transmitting UE ID and a receiving UE ID for the reserved resources.

In some cases, the PHY layer 405 may receive SCI (e.g., SCI-1 and SCI-2) based on monitoring for the SCI and may identify reserved sidelink resources and associated UE ID(s) based on receiving the SCI. The PHY layer 405 may measure an RSRP associated with the received SCI (e.g., SCI-1). In some cases, the PHY layer 405 may receive and decode SCI-1 but may fail to receive or decode SCI-2, such that the PHY layer 405 may identify reserved sidelink resources but may fail to identify a UE ID associated with the reserved resources.

At 430, the PHY layer 405 may identify a set of resources available for a sidelink transmission for the UE 115. For example, the PHY layer 405 may identify unreserved resources and resources reserved by SCI associated with an RSRP that does not meet an RSRP threshold. In some cases, the RSRP threshold may be increased based on a percentage of available resources not meeting a threshold percentage. For example, the PHY layer 405 may determine that the percentage of available resource does not meet a threshold percentage and may increase an RSRP threshold for the SCI (e.g., for one or more SCI). The PHY layer 405 may also identify the set of resources based on one or more parameters for selecting resources (e.g., a set of parameters) received from the MAC layer 410 (e.g., prior to identifying the resources).

The PHY layer 405 may use the list of UE IDs provided by the MAC layer 410 to identify the set of resources. In a first example, the PHY layer 405 may apply different RSRP thresholds to SCIs associated with a UE ID of the list of UE IDs (e.g., as compared to other SCI and associated UEs 115). For example, if a UE ID indicated by an SCI-2 is included in the list of UE IDs, the PHY layer 405 may compare an RSRP associated with a corresponding SCI-1 to an RSRP threshold associated with the list of UE IDs (e.g., an RSRPThreshold2). In some cases, the RSRP threshold associated with the list may be less than (e.g., much less than) an RSRP threshold for other UE IDs (e.g., a default or other RSRP threshold, such as RSRPThreshold), for example, which may increase protection of resources reserved by a UE 115 associated with the list (e.g., to avoid interference to UEs 115 associated with the list). In some cases, the RSRP threshold associated with the list may be greater than an RSRP threshold for other UE IDs (e.g., a default or other RSRP threshold, such as RSRPThreshold), for example, which may decrease protection of resources reserved by a UE 115 associated with the list.

If a UE ID indicated by an SCI-2 is not included in the list of UE IDs, the PHY layer 405 may compare an RSRP associated with a corresponding SCI-1 to a default RSRP threshold (e.g., an RSRPThreshold). In some cases, if the PHY layer 405 determines to increase RSRP thresholds to determine the set of resources (e.g., based on not meeting a percentage threshold for the set of resources), the PHY layer 405 may increase the default RSRP threshold and the RSRP threshold associated with the list by a same amount (e.g., increase both thresholds by 3 dB). In some other cases, the PHY layer 405 may increase the default RSRP threshold and the RSRP threshold associated with the list by different amounts. For example, the PHY layer 405 may increase the default RSRP threshold by 3 dB and may increase the RSRP threshold associated with the list by 1 dB.

In a second example, the PHY layer 405 may apply a default RSRP threshold to SCIs associated with a UE ID of the list of UE IDs (e.g., a same threshold as used for other SCI and associated UEs 115). For example, the PHY layer 405 may compare an RSRP associated with any SCI-1 to the default RSRP threshold. In such cases, if the PHY layer 405 determines to increase RSRP thresholds to determine the set of resources (e.g., based on not meeting a percentage threshold for the set of resources), the PHY layer 405 may increase the default RSRP threshold and the RSRP threshold associated with the list by different amounts. For example, the PHY layer 405 may increase the default RSRP threshold by 3 dB and may increase the RSRP threshold associated with the list by 1 dB.

At 435, the PHY layer 405 may report, to the MAC layer 410, the set of resources available for the sidelink transmission. For example, the PHY layer 405 may report the set of resources to the MAC layer 410 according to one or more communication or other protocols associated with the protocol stack of the UE 115. The set of resources may be reported based on using the list of UE IDs to identify available resources at 430 (e.g., based on using different RSRP thresholds, different threshold increases, or both).

At 440, the MAC layer 410 may select a resource (e.g., one or more resources) for the sidelink transmission based on the indicated set of resources. For example, the MAC layer 410 may randomly select the resource from the set of resources.

At 445, the MAC layer 410 may provide, to the PHY layer 405, an indication of the resource for the sidelink transmission. For example, the MAC layer 410 may provide an indication of the resource to the PHY layer 405 according to one or more communication or other protocols associated with the protocol stack of the UE 115.

At 450, the PHY layer 405 may transmit an SCI based on the resource indicated by the MAC layer 410. For example, the SCI may include a grant or other indication reserving the resource for the sidelink transmission and the PHY layer 405 may transmit the SCI in a broadcast or groupcast manner to indicate the reservation to one or more other UEs 115.

Figure 5:
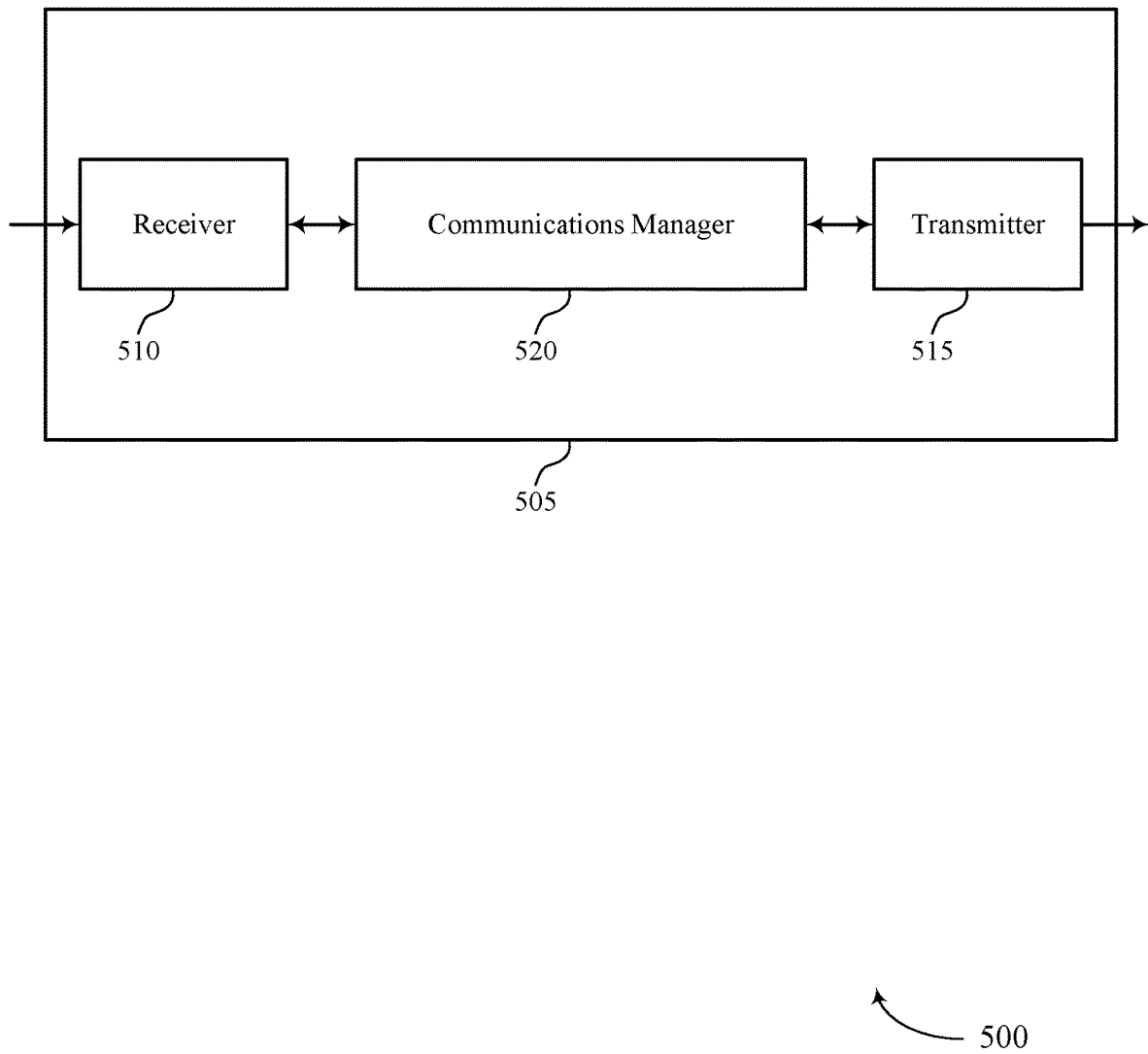
FIGS. 5 and 6 show block diagrams of devices that support techniques for sidelink resource selection in accordance with one or more aspects of the present disclosure.

FIG. 5 shows a block diagram 500 of a device 505 that supports techniques for sidelink resource selection in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for sidelink resource selection). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for sidelink resource selection). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for sidelink resource selection as described herein. For example, the communications manager 520, the receiver 510, the transmitter 515, or various combinations or components thereof may support a method for performing one or more of the functions described herein.

The communications manager 520 may be an example of means for performing various aspects of managing sidelink resources as described herein. In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, reporting, providing, determining) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving, at a first protocol stack layer of the first UE from a second protocol stack layer of the first UE, an indication of a set of parameters. The communications manager 520 may be configured as or otherwise support a means for reporting, from a first protocol stack layer of the first UE to the second protocol stack layer of the first UE, a set of resources available for a sidelink transmission for the first UE based on SCI and the set of parameters, the set of resources including one or more subsets of resources. The communications manager 520 may be configured as or otherwise support a means for reporting, to the second protocol stack layer, an indication of each subset of the set of resources. The communications manager 520 may be configured as or otherwise support a means for receiving, from the second protocol stack layer, an indication of a resource of the set of resources for the sidelink transmission in response to reporting the indication of the one or more subsets of resources.

Additionally or alternatively, the communications manager 520 may support wireless communication at a first UE in accordance with examples as disclosed herein. For example, the communications manager 520 may be configured as or otherwise support a means for providing, from a first protocol stack layer of the first UE to a second protocol stack layer of the first UE, an indication of a set of parameters. The communications manager 520 may be configured as or otherwise support a means for receiving, at a first protocol stack layer of the first UE and from the second protocol stack layer of the first UE, a report of a set of resources available for a sidelink transmission for the first UE, the set of resources including one or more subsets of resources. The communications manager 520 may be configured as or otherwise support a means for receiving, from the second protocol stack layer, an indication of each subset of the set of resources. The communications manager 520 may be configured as or otherwise support a means for providing, to the second protocol stack layer, an indication of a resource of the set of resources for the sidelink transmission in response to receiving the indication of the one or more subsets of resources.

Additionally or alternatively, the communications manager 520 may support wireless communication at a UE in accordance with examples as disclosed herein. For example, the communications manager 520 may be configured as or otherwise support a means for receiving, at a first protocol stack layer of the first UE and from a second protocol stack layer of the first UE, an indication of a list of IDs associated with one or more second UEs. The communications manager 520 may be configured as or otherwise support a means for reporting, to the second protocol stack layer, an indication of a set of resources available for a sidelink transmission for the first UE based on the list of IDs and SCI. The communications manager 520 may be configured as or otherwise support a means for receiving, from the second protocol stack layer, an indication of a resource of the set of resources for the sidelink transmission in response to reporting the indication of the set of resources.

Additionally or alternatively, the communications manager 520 may support wireless communication at a first UE in accordance with examples as disclosed herein. For example, the communications manager 520 may be configured as or otherwise support a means for providing, from a first protocol stack layer of the first UE to a second protocol stack layer of the first UE, an indication of a list of IDs associated with one or more second UEs. The communications manager 520 may be configured as or otherwise support a means for receiving, from the second protocol stack layer, an indication of a set of resources available for a sidelink transmission for the first UE based on providing the list of IDs. The communications manager 520 may be configured as or otherwise support a means for providing, to the second protocol stack layer, an indication of a resource of the set of resources for the sidelink transmission in response to receiving the indication of the set of resources.

The actions performed by the communications manager 520, among other examples herein, may be implemented to realize one or more potential advantages. For example, communications manager 520 may increase available battery power and communication quality at a wireless device (e.g., a UE 115) by supporting selection of sidelink resources based on resource priority. The increase in communication quality may result in increased link performance and decreased overhead based on the selected sidelink resources. Accordingly, communications manager 520 may save power and increase battery life at a wireless device (e.g., a UE 115) by strategically increasing a quality of communications at a wireless device (e.g., a UE 115).

Figure 6:
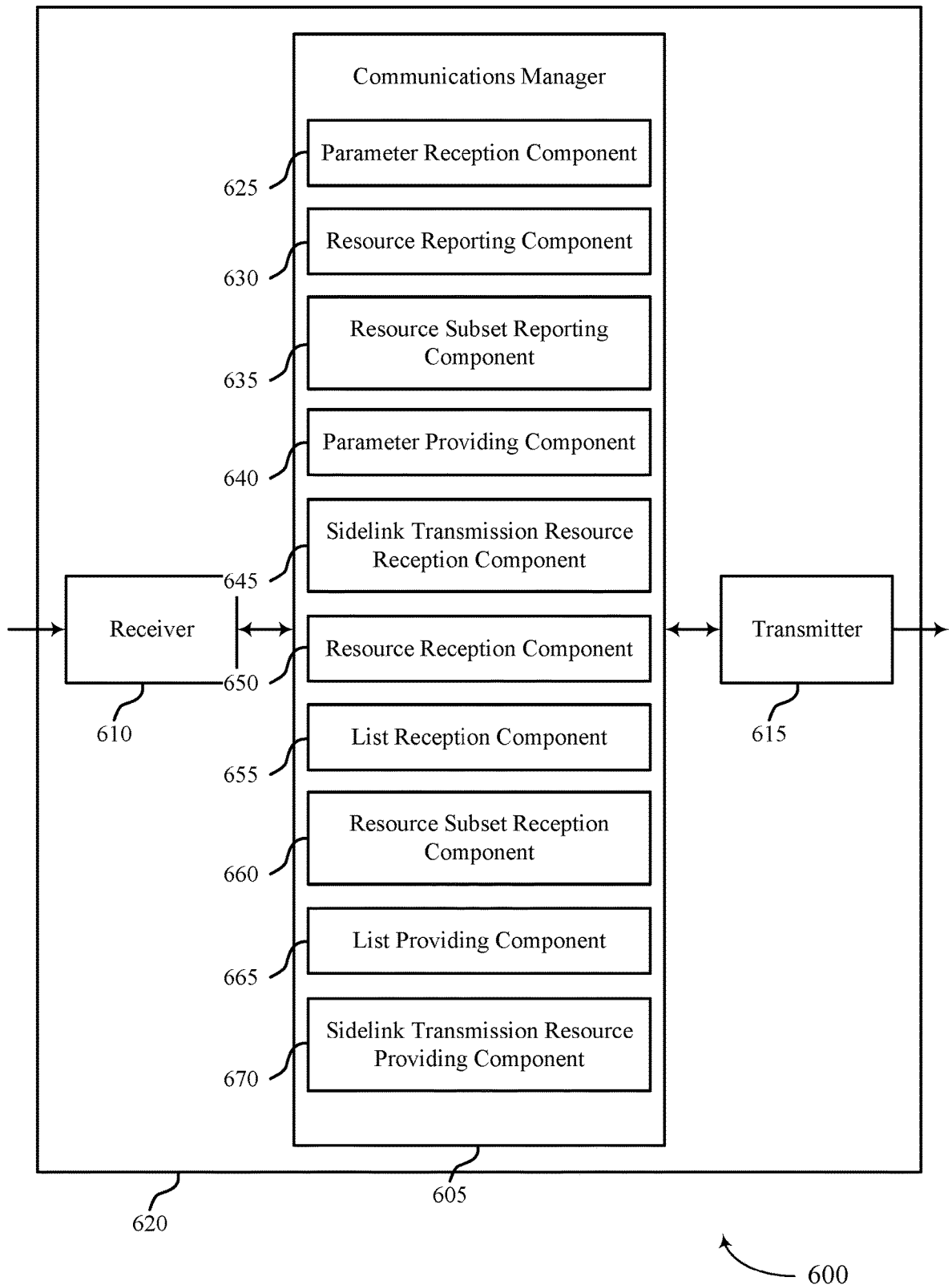

FIG. 6 shows a block diagram 600 of a device 605 that supports techniques for sidelink resource selection in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for sidelink resource selection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for sidelink resource selection). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for sidelink resource selection as described herein. For example, the communications manager 620 may include a parameter reception component 625, a resource reporting component 630, a resource subset reporting component 635, a sidelink transmission resource reception component 640, a parameter providing component 645, a resource reception component 650, a resource subset reception component 655, a sidelink transmission resource providing component 660, a list reception component 665, a list providing component 670, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The parameter reception component 625 may be configured as or otherwise support a means for receiving, at a first protocol stack layer of the first UE from a second protocol stack layer of the first UE, an indication of a set of parameters. The resource reporting component 630 may be configured as or otherwise support a means for reporting, from a first protocol stack layer of the first UE to the second protocol stack layer of the first UE, a set of resources available for a sidelink transmission for the first UE based on SCI and the set of parameters, the set of resources including one or more subsets of resources. The resource subset reporting component 635 may be configured as or otherwise support a means for reporting, to the second protocol stack layer, an indication of each subset of the set of resources. The sidelink transmission resource reception component 640 may be configured as or otherwise support a means for receiving, from the second protocol stack layer, an indication of a resource of the set of resources for the sidelink transmission in response to reporting the indication of the one or more subsets of resources.

Additionally or alternatively, the communications manager 620 may support wireless communication at a first UE in accordance with examples as disclosed herein. The parameter providing component 645 may be configured as or otherwise support a means for providing, from a first protocol stack layer of the first UE to a second protocol stack layer of the first UE, an indication of a set of parameters. The resource reception component 650 may be configured as or otherwise support a means for receiving, at a first protocol stack layer of the first UE and from the second protocol stack layer of the first UE, a report of a set of resources available for a sidelink transmission for the first UE, the set of resources including one or more subsets of resources. The resource subset reception component 655 may be configured as or otherwise support a means for receiving, from the second protocol stack layer, an indication of each subset of the set of resources. The sidelink transmission resource providing component 660 may be configured as or otherwise support a means for providing, to the second protocol stack layer, an indication of a resource of the set of resources for the sidelink transmission in response to receiving the indication of the one or more subsets of resources.

Additionally or alternatively, the communications manager 620 may support wireless communication at a UE in accordance with examples as disclosed herein. The list reception component 665 may be configured as or otherwise support a means for receiving, at a first protocol stack layer of the first UE and from a second protocol stack layer of the first UE, an indication of a list of IDs associated with one or more second UEs. The resource reporting component 630 may be configured as or otherwise support a means for reporting, to the second protocol stack layer, an indication of a set of resources available for a sidelink transmission for the first UE based on the list of IDs and SCI. The sidelink transmission resource reception component 640 may be configured as or otherwise support a means for receiving, from the second protocol stack layer, an indication of a resource of the set of resources for the sidelink transmission in response to reporting the indication of the set of resources.

Additionally or alternatively, the communications manager 620 may support wireless communication at a first UE in accordance with examples as disclosed herein. The list providing component 670 may be configured as or otherwise support a means for providing, from a first protocol stack layer of the first UE to a second protocol stack layer of the first UE, an indication of a list of IDs associated with one or more second UEs. The resource reception component 650 may be configured as or otherwise support a means for receiving, from the second protocol stack layer, an indication of a set of resources available for a sidelink transmission for the first UE based on providing the list of IDs. The sidelink transmission resource providing component 660 may be configured as or otherwise support a means for providing, to the second protocol stack layer, an indication of a resource of the set of resources for the sidelink transmission in response to receiving the indication of the set of resources.

A processor of a wireless device (e.g., controlling the receiver 610, the transmitter 615, or the transceiver 815 as described with reference to FIG. 8) may increase available battery power and communication quality. The increased communication quality may increase available battery power and throughput (e.g., via implementation of system components described with reference to FIG. 7) compared to other systems and techniques, for example, that do not support sidelink resource selection based on priority, which may decrease communication quality and increase power consumption. Further, the processor of the wireless device may identify one or more aspects of sidelink resources within a resource selection window to perform the sidelink resource selection. The processor of the wireless device may use the selected sidelink resource to perform one or more actions that may result in increased communication quality, as well as save power and increase battery life at the wireless device (e.g., by strategically supporting increased communication quality by using the selected sidelink resource), among other benefits.

Figure 7:
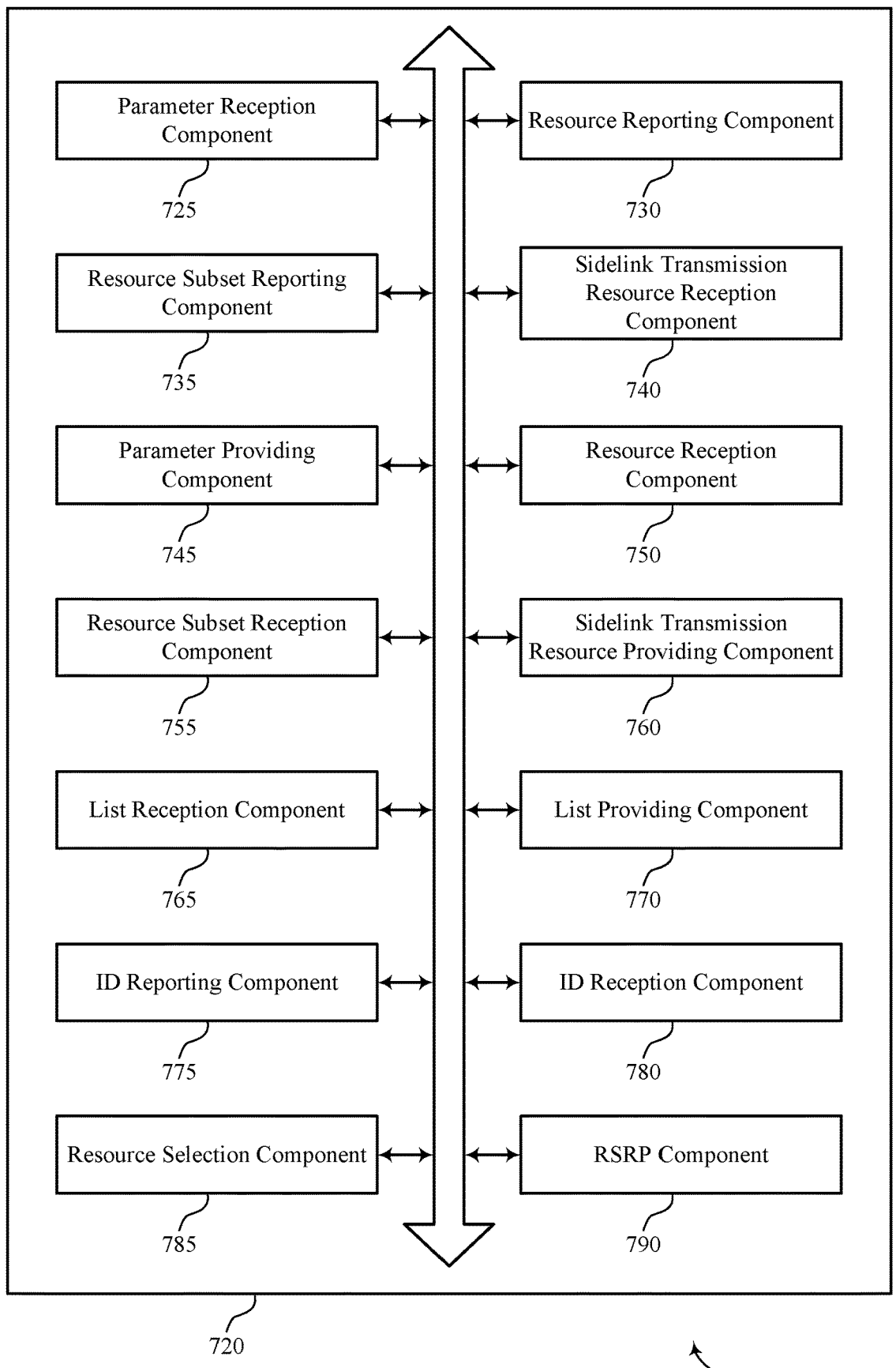
FIG. 7 shows a block diagram of a communications manager that supports techniques for sidelink resource selection in accordance with one or more aspects of the present disclosure.

FIG. 7 shows a block diagram 700 of a communications manager 720 that supports techniques for sidelink resource selection in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for sidelink resource selection as described herein. For example, the communications manager 720 may include a parameter reception component 725, a resource reporting component 730, a resource subset reporting component 735, a sidelink transmission resource reception component 740, a parameter providing component 745, a resource reception component 750, a resource subset reception component 755, a sidelink transmission resource providing component 760, a list reception component 765, a list providing component 770, an ID reporting component 775, an ID reception component 780, a resource selection component 785, an RSRP component 790, or any combination thereof. Each of these components may communicate, directly or indirectly, with one another (e.g., via one or more buses).

The communications manager 720 may support wireless communication at a first UE in accordance with examples as disclosed herein. The parameter reception component 725 may be configured as or otherwise support a means for receiving, at a first protocol stack layer of the first UE from a second protocol stack layer of the first UE, an indication of a set of parameters. The resource reporting component 730 may be configured as or otherwise support a means for reporting, from a first protocol stack layer of the first UE to the second protocol stack layer of the first UE, a set of resources available for a sidelink transmission for the first UE based on SCI and the set of parameters, the set of resources including one or more subsets of resources. The resource subset reporting component 735 may be configured as or otherwise support a means for reporting, to the second protocol stack layer, an indication of each subset of the set of resources. The sidelink transmission resource reception component 740 may be configured as or otherwise support a means for receiving, from the second protocol stack layer, an indication of a resource of the set of resources for the sidelink transmission in response to reporting the indication of the one or more subsets of resources.

In some examples, the resource subset reporting component 735 may be configured as or otherwise support a means for indicating, for each subset of the set of resources, a respective type of the subset of resources. In some examples, the resource subset reporting component 735 may be configured as or otherwise support a means for a first subset of resources unassociated with SCI reserving resources for another sidelink transmission. In some examples, the resource subset reporting component 735 may be configured as or otherwise support a means for a second subset of resources reserved by SCI corresponding to an RSRP measurement being below a threshold. In some examples, the resource subset reporting component 735 may be configured as or otherwise support a means for a third subset of resources associated with spatial reuse of resources and reserved by SCI corresponding to an RSRP measurement satisfying a threshold. In some examples, the resource subset reporting component 735 may be configured as or otherwise support a means for any combination thereof.

In some examples, the resource subset reporting component 735 may be configured as or otherwise support a means for a first group of resources for which the first UE fails to decode second SCI identifying a second UE associated with transmissions on the first group of resources. In some examples, the resource subset reporting component 735 may be configured as or otherwise support a means for a second group of resources for which the first UE decodes second SCI that identifies a UE associated with transmissions on the second group of resources.

In some examples, the resource subset reporting component 735 may be configured as or otherwise support a means for reporting, to the second protocol stack layer, an indication of a respective transmit power constraint for each resource of the third subset of resources.

In some examples, the ID reporting component 775 may be configured as or otherwise support a means for reporting, to the second protocol stack layer, an ID of a transmitting UE or a receiving UE, or both, associated with a resource of the set of resources. In some examples, the parameter reception component 725 may be configured as or otherwise support a means for receiving, from the second protocol stack layer, an indication to report the ID of the transmitting UE, or the receiving UE, or both, the reporting the ID based on receiving the indication to report the ID.

In some examples, the ID reporting component 775 may be configured as or otherwise support a means for determining that a percentage of total resources associated with the set of resources fails to meet a threshold percentage. In some examples, the ID reporting component 775 may be configured as or otherwise support a means for increasing an RSRP threshold for determining the set of resources, the reporting the set of resources based on increasing the RSRP threshold and the reporting the ID based on increasing the RSRP threshold.

In some examples, the ID reporting component 775 may be configured as or otherwise support a means for determining that an amount of resources of a first subset of the set of resources fails to meet a threshold, the first subset unassociated with SCI reserving resources for another sidelink transmission and the reporting the ID based on determining that the amount of resources of the first subset of the set of resources fails to meet the threshold. In some examples, the ID reporting component 775 may be configured as or otherwise support a means for determining that an amount of resources of two or more subsets of the set of resources fails to meet a threshold, the reporting the ID based on determining that the amount of resources of the two or more subsets of the set of resources fails to meet the threshold.

Additionally or alternatively, the communications manager 720 may support wireless communication at a first UE in accordance with examples as disclosed herein. The parameter providing component 745 may be configured as or otherwise support a means for providing, from a first protocol stack layer of the first UE to a second protocol stack layer of the first UE, an indication of a set of parameters. The resource reception component 750 may be configured as or otherwise support a means for receiving, at a first protocol stack layer of the first UE and from the second protocol stack layer of the first UE, a report of a set of resources available for a sidelink transmission for the first UE, the set of resources including one or more subsets of resources. The resource subset reception component 755 may be configured as or otherwise support a means for receiving, from the second protocol stack layer, an indication of each subset of the set of resources. The sidelink transmission resource providing component 760 may be configured as or otherwise support a means for providing, to the second protocol stack layer, an indication of a resource of the set of resources for the sidelink transmission in response to receiving the indication of the one or more subsets of resources.

In some examples, the resource subset reception component 755 may be configured as or otherwise support a means for receiving, for each subset of the set of resources, an indication of a respective type of the subset of resources. In some examples, the resource subset reception component 755 may be configured as or otherwise support a means for a first subset of resources unassociated with SCI reserving resources for another sidelink transmission. In some examples, the resource subset reception component 755 may be configured as or otherwise support a means for a second subset of resources reserved by SCI corresponding to an RSRP measurement being below a threshold. In some examples, the resource subset reception component 755 may be configured as or otherwise support a means for a third subset of resources associated with spatial reuse of resources and reserved by SCI corresponding to an RSRP measurement satisfying a threshold. In some examples, the resource subset reception component 755 may be configured as or otherwise support a means for any combination thereof.

In some examples, the resource subset reception component 755 may be configured as or otherwise support a means for a first group of resources for which the first UE fails to decode second SCI identifying a second UE associated with transmissions on the first group of resources. In some examples, the resource subset reception component 755 may be configured as or otherwise support a means for a second group of resources for which the first UE decodes second SCI that identifies a UE associated with transmissions on the second group of resources.

In some examples, the resource subset reception component 755 may be configured as or otherwise support a means for receiving, from the second protocol stack layer, an indication of a respective transmit power constraint for each resource of the third subset of resources.

In some examples, the ID reception component 780 may be configured as or otherwise support a means for receiving, from the second protocol stack layer, an ID of a transmitting UE or a receiving UE, or both, associated with a resource of the set of resources. In some examples, the ID reception component 780 may be configured as or otherwise support a means for providing, to the second protocol stack layer, an indication to report the ID of the transmitting UE, or the receiving UE, or both, the receiving the ID based on providing the indication to report the ID.

In some examples, the resource selection component 785 may be configured as or otherwise support a means for determining a respective probability for each subset of the one or more subsets. In some examples, the resource selection component 785 may be configured as or otherwise support a means for selecting the resource for the sidelink transmission from the set of resources based on the respective probability for the one or more subsets, the providing the indication of the resource for the sidelink transmission based on selecting the resource. In some examples, the respective probability for the one or more subsets is based on a traffic priority for the sidelink transmission, or a type of the one or more subsets, or an ID associated with a second UE, or a transmit power for the sidelink transmission, or a transmit power constraint, or a retransmission status of the sidelink transmission, or any combination thereof.

In some examples, the resource selection component 785 may be configured as or otherwise support a means for selecting the resource for the sidelink transmission from the set of resources based on a sequence associated with the one or more subsets, the providing the indication of the resource for the sidelink transmission based on selecting the resource. In some examples, the resource selection component 785 may be configured as or otherwise support a means for selecting the resource for the sidelink transmission from a subset of the one or more subsets based on a priority of the sidelink transmission, the providing the indication of the resource for the sidelink transmission based on selecting the resource.

Additionally or alternatively, the communications manager 720 may support wireless communication at a UE in accordance with examples as disclosed herein. The list reception component 765 may be configured as or otherwise support a means for receiving, at a first protocol stack layer of the first UE and from a second protocol stack layer of the first UE, an indication of a list of IDs associated with one or more second UEs. In some examples, the resource reporting component 730 may be configured as or otherwise support a means for reporting, to the second protocol stack layer, an indication of a set of resources available for a sidelink transmission for the first UE based on the list of IDs and SCI. In some examples, the sidelink transmission resource reception component 740 may be configured as or otherwise support a means for receiving, from the second protocol stack layer, an indication of a resource of the set of resources for the sidelink transmission in response to reporting the indication of the set of resources.

In some examples, the RSRP component 790 may be configured as or otherwise support a means for receiving first SCI indicating a scheduled sidelink transmission for a third UE. In some examples, the RSRP component 790 may be configured as or otherwise support a means for determining whether the third UE is associated with an ID of the list of IDs based on receiving the first SCI. In some examples, the RSRP component 790 may be configured as or otherwise support a means for determining that the third UE is associated with an ID of the list of IDs. In some examples, the RSRP component 790 may be configured as or otherwise support a means for comparing an RSRP associated with the first SCI with a first RSRP threshold corresponding to the list of IDs based on determining that the third UE is associated with an ID of the list of IDs.

In some examples, the RSRP component 790 may be configured as or otherwise support a means for determining that a percentage of total resources associated with the set of resources fails to meet a threshold percentage. In some examples, the RSRP component 790 may be configured as or otherwise support a means for increasing the first RSRP threshold by a first amount for determining the set of resources, the reporting the set of resources based on increasing the first RSRP threshold. In some examples, the RSRP component 790 may be configured as or otherwise support a means for increasing a second RSRP threshold associated with one or more third UEs by the first amount for determining the set of resources, the reporting the set of resources based on increasing the second RSRP threshold.

In some examples, the RSRP component 790 may be configured as or otherwise support a means for determining that a percentage of total resources associated with the set of resources fails to meet a threshold percentage. In some examples, the RSRP component 790 may be configured as or otherwise support a means for increasing the first RSRP threshold by a first amount for determining the set of resources, the reporting the set of resources based on increasing the first RSRP threshold. In some examples, the RSRP component 790 may be configured as or otherwise support a means for increasing a second RSRP threshold associated with one or more third UEs by a second amount for determining the set of resources, the reporting the set of resources based on increasing the second RSRP threshold.

In some examples, the RSRP component 790 may be configured as or otherwise support a means for receiving first SCI indicating a scheduled sidelink transmission for a second UE of the one or more second UEs. In some examples, the RSRP component 790 may be configured as or otherwise support a means for comparing an RSRP associated with the first SCI with a first RSRP threshold equal to a second RSRP threshold associated with one or more third UEs, the reporting the set of resources based on comparing the RSRP with the first RSRP threshold.

In some examples, the RSRP component 790 may be configured as or otherwise support a means for determining that a percentage of total resources associated with the set of resources fails to meet a threshold percentage. In some examples, the RSRP component 790 may be configured as or otherwise support a means for increasing the first RSRP threshold by a first amount for determining the set of resources, the reporting the set of resources based on increasing the first RSRP threshold. In some examples, the RSRP component 790 may be configured as or otherwise support a means for increasing the second RSRP threshold by a second amount for determining the set of resources, the reporting the set of resources based on increasing the second RSRP threshold.

Additionally or alternatively, the communications manager 720 may support wireless communication at a first UE in accordance with examples as disclosed herein. The list providing component 770 may be configured as or otherwise support a means for providing, from a first protocol stack layer of the first UE to a second protocol stack layer of the first UE, an indication of a list of IDs associated with one or more second UEs. In some examples, the resource reception component 750 may be configured as or otherwise support a means for receiving, from the second protocol stack layer, an indication of a set of resources available for a sidelink transmission for the first UE based on providing the list of IDs. In some examples, the sidelink transmission resource providing component 760 may be configured as or otherwise support a means for providing, to the second protocol stack layer, an indication of a resource of the set of resources for the sidelink transmission in response to receiving the indication of the set of resources.

In some examples, the list providing component 770 may be configured as or otherwise support a means for determining the list of IDs based on communications with the one or more second UEs, the providing the indication of the list of IDs based on determining the list of IDs. In some examples, the communications indicate group information including a speed or a velocity, or both, associated with the one or more second UEs.

In some examples, the one or more second UEs are associated with a first RSRP threshold for determining the set of resources and one or more other UEs are associated with a second RSRP threshold for determining the set of resources. In some examples, the one or more second UEs are associated with a first amount of an RSRP threshold increase for determining the set of resources and one or more other UEs are associated with a second amount of an RSRP threshold increase for determining the set of resources.

Figure 8:
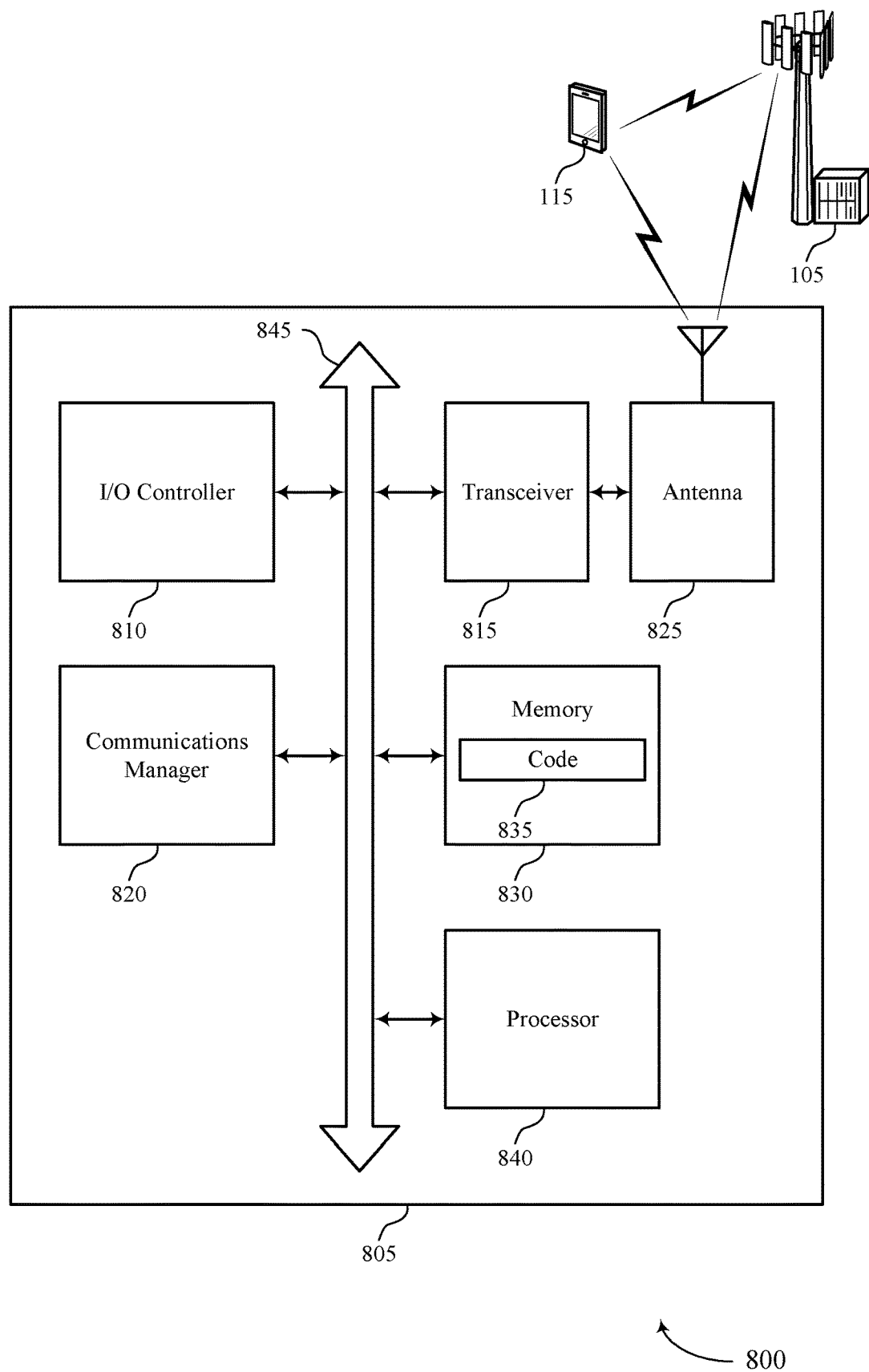
FIG. 8 shows a diagram of a system including a device that supports techniques for sidelink resource selection in accordance with one or more aspects of the present disclosure.

FIG. 8 shows a diagram of a system 800 including a device 805 that supports techniques for sidelink resource selection in accordance with one or more aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for sidelink resource selection). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving, at a first protocol stack layer of the first UE from a second protocol stack layer of the first UE, an indication of a set of parameters. The communications manager 820 may be configured as or otherwise support a means for reporting, from a first protocol stack layer of the first UE to the second protocol stack layer of the first UE, a set of resources available for a sidelink transmission for the first UE based on SCI and the set of parameters, the set of resources including one or more subsets of resources. The communications manager 820 may be configured as or otherwise support a means for reporting, to the second protocol stack layer, an indication of each subset of the set of resources. The communications manager 820 may be configured as or otherwise support a means for receiving, from the second protocol stack layer, an indication of a resource of the set of resources for the sidelink transmission in response to reporting the indication of the one or more subsets of resources.

Additionally or alternatively, the communications manager 820 may support wireless communication at a first UE in accordance with examples as disclosed herein. For example, the communications manager 820 may be configured as or otherwise support a means for providing, from a first protocol stack layer of the first UE to a second protocol stack layer of the first UE, an indication of a set of parameters. The communications manager 820 may be configured as or otherwise support a means for receiving, at a first protocol stack layer of the first UE and from the second protocol stack layer of the first UE, a report of a set of resources available for a sidelink transmission for the first UE, the set of resources including one or more subsets of resources. The communications manager 820 may be configured as or otherwise support a means for receiving, from the second protocol stack layer, an indication of each subset of the set of resources. The communications manager 820 may be configured as or otherwise support a means for providing, to the second protocol stack layer, an indication of a resource of the set of resources for the sidelink transmission in response to receiving the indication of the one or more subsets of resources.

Additionally or alternatively, the communications manager 820 may support wireless communication at a UE in accordance with examples as disclosed herein. For example, the communications manager 820 may be configured as or otherwise support a means for receiving, at a first protocol stack layer of the first UE and from a second protocol stack layer of the first UE, an indication of a list of IDs associated with one or more second UEs. The communications manager 820 may be configured as or otherwise support a means for reporting, to the second protocol stack layer, an indication of a set of resources available for a sidelink transmission for the first UE based on the list of IDs and SCI. The communications manager 820 may be configured as or otherwise support a means for receiving, from the second protocol stack layer, an indication of a resource of the set of resources for the sidelink transmission in response to reporting the indication of the set of resources.

Additionally or alternatively, the communications manager 820 may support wireless communication at a first UE in accordance with examples as disclosed herein. For example, the communications manager 820 may be configured as or otherwise support a means for providing, from a first protocol stack layer of the first UE to a second protocol stack layer of the first UE, an indication of a list of IDs associated with one or more second UEs. The communications manager 820 may be configured as or otherwise support a means for receiving, from the second protocol stack layer, an indication of a set of resources available for a sidelink transmission for the first UE based on providing the list of IDs. The communications manager 820 may be configured as or otherwise support a means for providing, to the second protocol stack layer, an indication of a resource of the set of resources for the sidelink transmission in response to receiving the indication of the set of resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for sidelink resource selection as described herein, or the processor 840 and the memory 830 may be otherwise configured to perform or support such operations.

Figure 9:
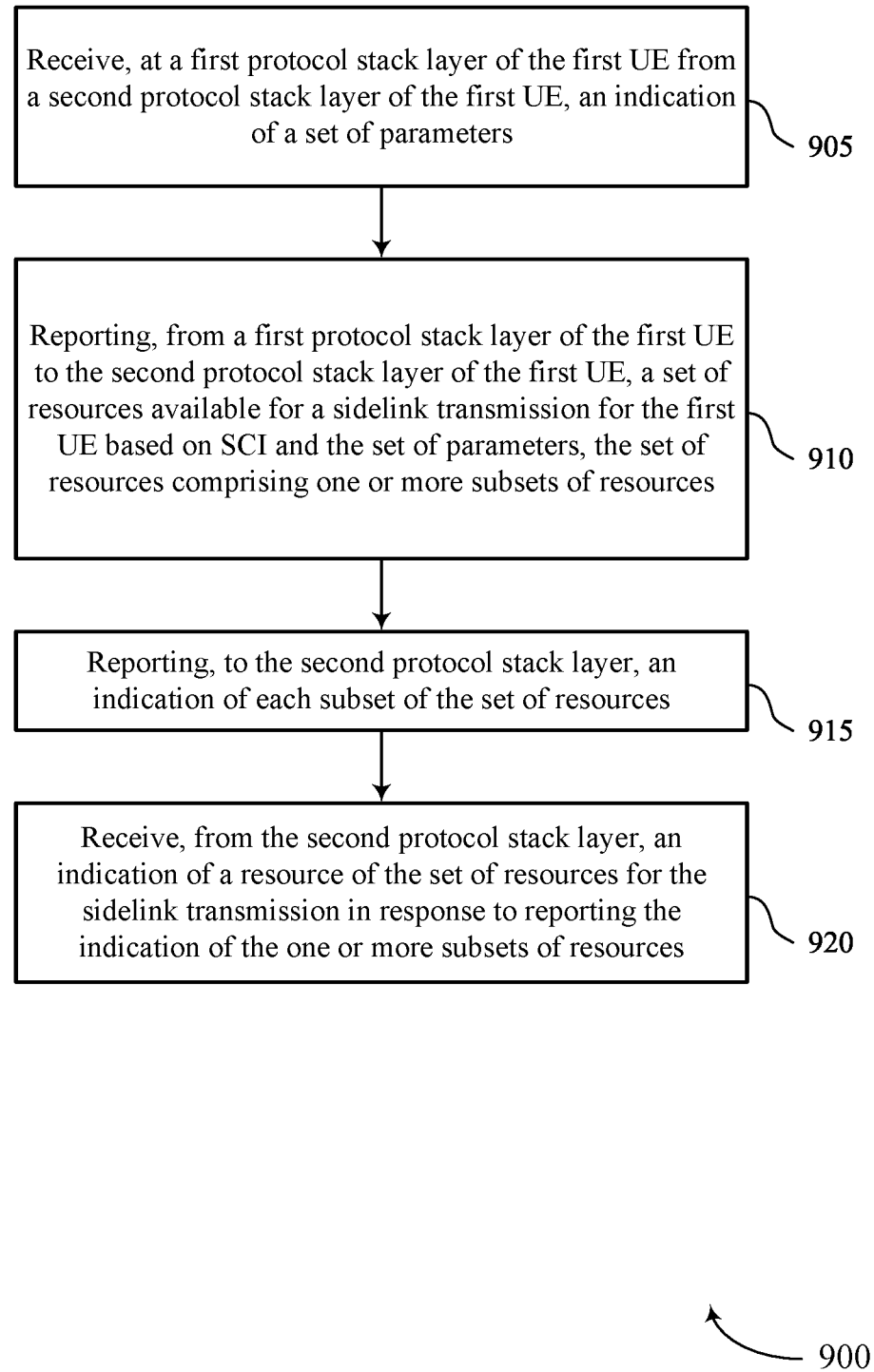
FIGS. 9 through 14 show flowcharts illustrating methods that support techniques for sidelink resource selection in accordance with one or more aspects of the present disclosure.

FIG. 9 shows a flowchart illustrating a method 900 that supports techniques for sidelink resource selection in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, at a first protocol stack layer of the first UE from a second protocol stack layer of the first UE, an indication of a set of parameters. The operations of 905 may be performed in accordance with examples as disclosed herein. In some examples, aspects of the operations of 905 may be performed by a parameter reception component 725 as described with reference to FIG. 7.

At 910, the method may include reporting, from a first protocol stack layer of the first UE to the second protocol stack layer of the first UE, a set of resources available for a sidelink transmission for the first UE based on SCI and the set of parameters, the set of resources including one or more subsets of resources. The operations of 910 may be performed in accordance with examples as disclosed herein. In some examples, aspects of the operations of 910 may be performed by a resource reporting component 730 as described with reference to FIG. 7.

At 915, the method may include reporting, to the second protocol stack layer, an indication of each subset of the set of resources. The operations of 915 may be performed in accordance with examples as disclosed herein. In some examples, aspects of the operations of 915 may be performed by a resource subset reporting component 735 as described with reference to FIG. 7.

At 920, the method may include receiving, from the second protocol stack layer, an indication of a resource of the set of resources for the sidelink transmission in response to reporting the indication of the one or more subsets of resources. The operations of 920 may be performed in accordance with examples as disclosed herein. In some examples, aspects of the operations of 920 may be performed by a sidelink transmission resource reception component 740 as described with reference to FIG. 7.

Figure 10:
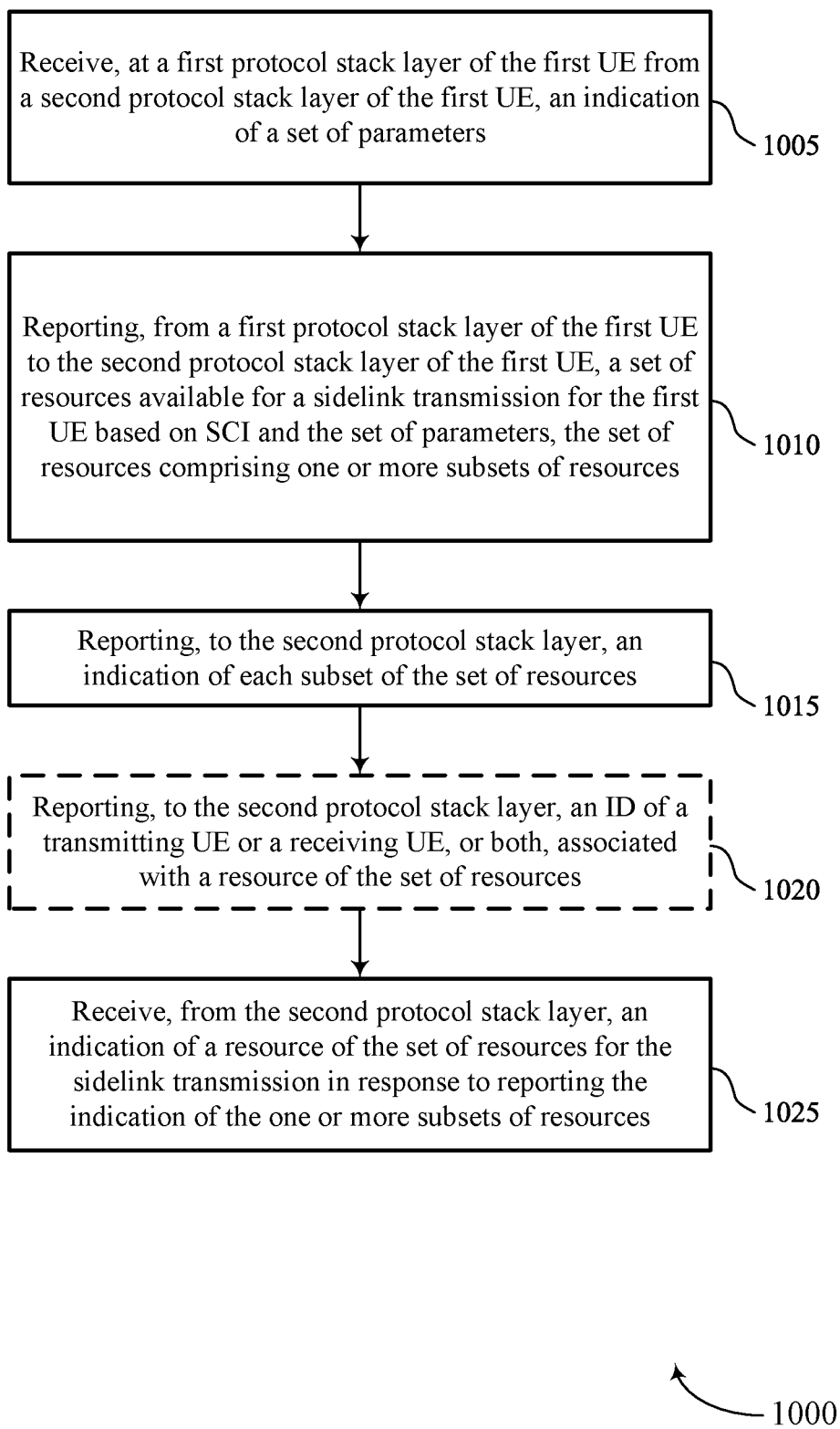

FIG. 10 shows a flowchart illustrating a method 1000 that supports techniques for sidelink resource selection in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, at a first protocol stack layer of the first UE from a second protocol stack layer of the first UE, an indication of a set of parameters. The operations of 1005 may be performed in accordance with examples as disclosed herein. In some examples, aspects of the operations of 1005 may be performed by a parameter reception component 725 as described with reference to FIG. 7.

At 1010, the method may include reporting, from a first protocol stack layer of the first UE to the second protocol stack layer of the first UE, a set of resources available for a sidelink transmission for the first UE based on SCI and the set of parameters, the set of resources including one or more subsets of resources. The operations of 1010 may be performed in accordance with examples as disclosed herein. In some examples, aspects of the operations of 1010 may be performed by a resource reporting component 730 as described with reference to FIG. 7.

At 1015, the method may include reporting, to the second protocol stack layer, an indication of each subset of the set of resources. The operations of 1015 may be performed in accordance with examples as disclosed herein. In some examples, aspects of the operations of 1015 may be performed by a resource subset reporting component 735 as described with reference to FIG. 7.

At 1020, the method may include reporting, to the second protocol stack layer, an ID of a transmitting UE or a receiving UE, or both, associated with a resource of the set of resources. The operations of 1020 may be performed in accordance with examples as disclosed herein. In some examples, aspects of the operations of 1020 may be performed by an ID reporting component 775 as described with reference to FIG. 7.

At 1025, the method may include receiving, from the second protocol stack layer, an indication of a resource of the set of resources for the sidelink transmission in response to reporting the indication of the one or more subsets of resources. The operations of 1025 may be performed in accordance with examples as disclosed herein. In some examples, aspects of the operations of 1025 may be performed by a sidelink transmission resource reception component 740 as described with reference to FIG. 7.

Figure 11:
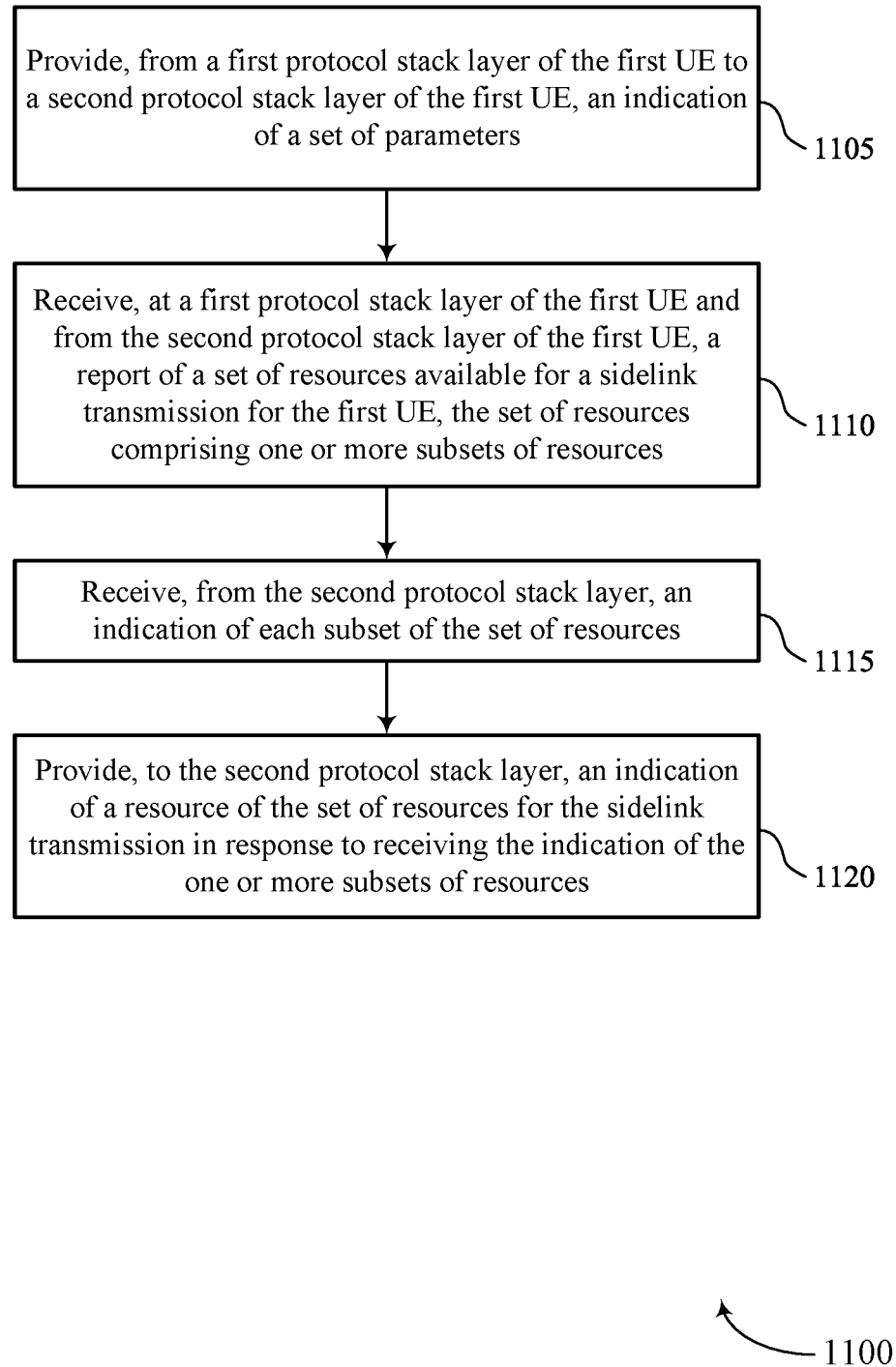

FIG. 11 shows a flowchart illustrating a method 1100 that supports techniques for sidelink resource selection in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include providing, from a first protocol stack layer of the first UE to a second protocol stack layer of the first UE, an indication of a set of parameters. The operations of 1105 may be performed in accordance with examples as disclosed herein. In some examples, aspects of the operations of 1105 may be performed by a parameter providing component 745 as described with reference to FIG. 7.

At 1110, the method may include receiving, at a first protocol stack layer of the first UE and from the second protocol stack layer of the first UE, a report of a set of resources available for a sidelink transmission for the first UE, the set of resources including one or more subsets of resources. The operations of 1110 may be performed in accordance with examples as disclosed herein. In some examples, aspects of the operations of 1110 may be performed by a resource reception component 750 as described with reference to FIG. 7.

At 1115, the method may include receiving, from the second protocol stack layer, an indication of each subset of the set of resources. The operations of 1115 may be performed in accordance with examples as disclosed herein. In some examples, aspects of the operations of 1115 may be performed by a resource subset reception component 755 as described with reference to FIG. 7.

At 1120, the method may include providing, to the second protocol stack layer, an indication of a resource of the set of resources for the sidelink transmission in response to receiving the indication of the one or more subsets of resources. The operations of 1120 may be performed in accordance with examples as disclosed herein. In some examples, aspects of the operations of 1120 may be performed by a sidelink transmission resource providing component 760 as described with reference to FIG. 7.

Figure 12:
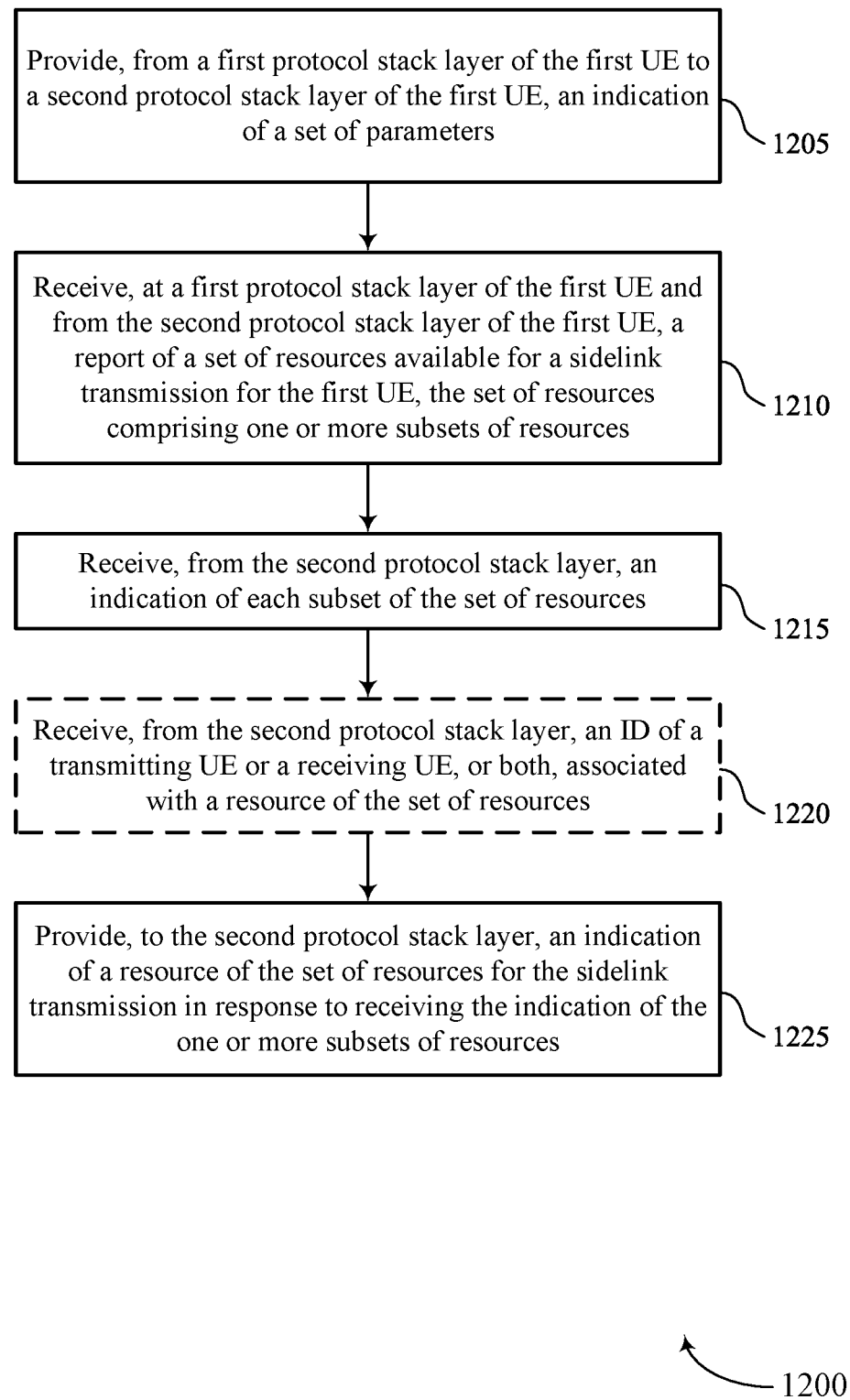

FIG. 12 shows a flowchart illustrating a method 1200 that supports techniques for sidelink resource selection in accordance with one or more aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include providing, from a first protocol stack layer of the first UE to a second protocol stack layer of the first UE, an indication of a set of parameters. The operations of 1205 may be performed in accordance with examples as disclosed herein. In some examples, aspects of the operations of 1205 may be performed by a parameter providing component 745 as described with reference to FIG. 7.

At 1210, the method may include receiving, at a first protocol stack layer of the first UE and from the second protocol stack layer of the first UE, a report of a set of resources available for a sidelink transmission for the first UE, the set of resources including one or more subsets of resources. The operations of 1210 may be performed in accordance with examples as disclosed herein. In some examples, aspects of the operations of 1210 may be performed by a resource reception component 750 as described with reference to FIG. 7.

At 1215, the method may include receiving, from the second protocol stack layer, an indication of each subset of the set of resources. The operations of 1215 may be performed in accordance with examples as disclosed herein. In some examples, aspects of the operations of 1215 may be performed by a resource subset reception component 755 as described with reference to FIG. 7.

At 1220, the method may include receiving, from the second protocol stack layer, an ID of a transmitting UE or a receiving UE, or both, associated with a resource of the set of resources. The operations of 1220 may be performed in accordance with examples as disclosed herein. In some examples, aspects of the operations of 1220 may be performed by an ID reception component 780 as described with reference to FIG. 7.

At 1225, the method may include providing, to the second protocol stack layer, an indication of a resource of the set of resources for the sidelink transmission in response to receiving the indication of the one or more subsets of resources. The operations of 1225 may be performed in accordance with examples as disclosed herein. In some examples, aspects of the operations of 1225 may be performed by a sidelink transmission resource providing component 760 as described with reference to FIG. 7.

Figure 13:
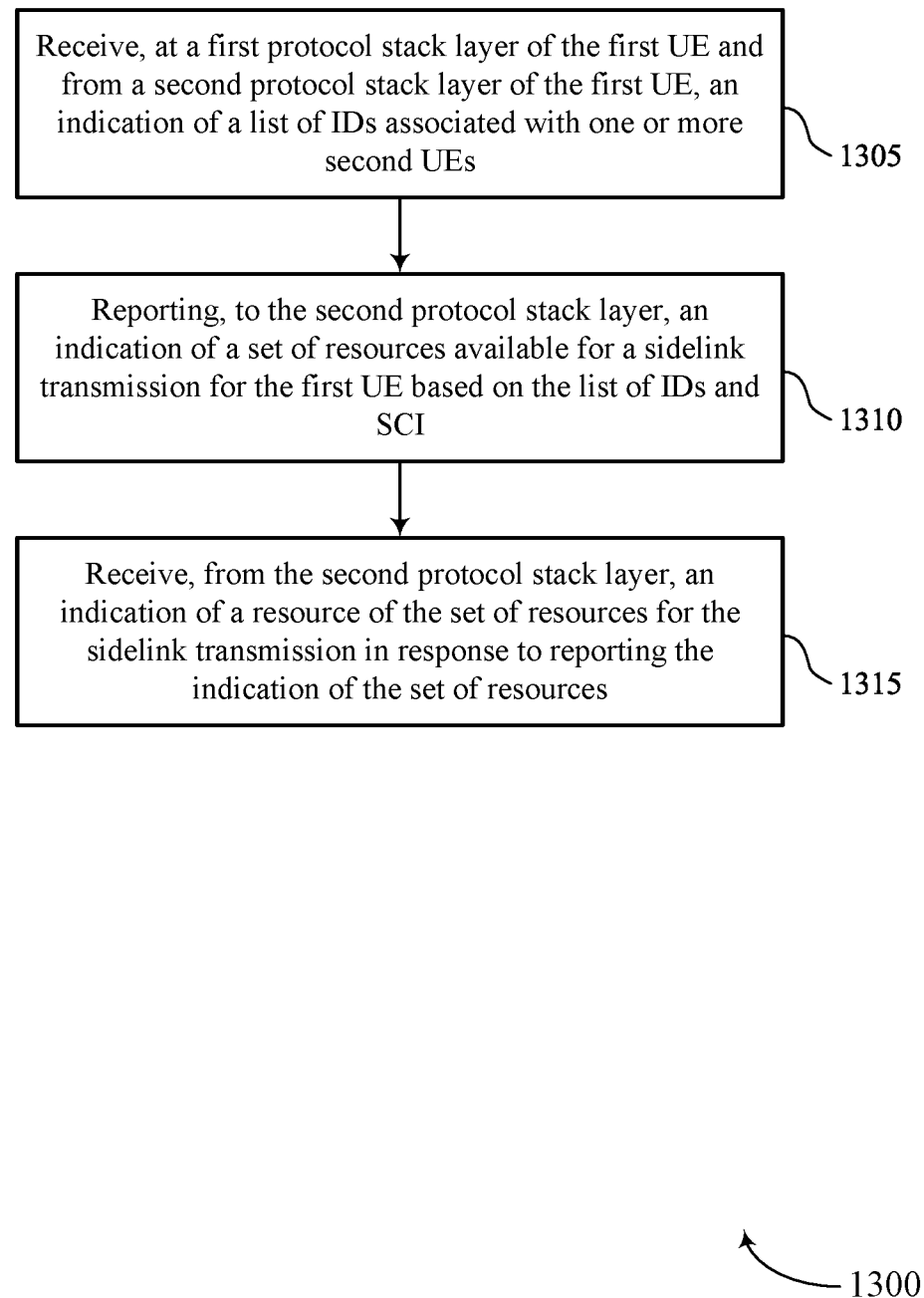

FIG. 13 shows a flowchart illustrating a method 1300 that supports techniques for sidelink resource selection in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, at a first protocol stack layer of the first UE and from a second protocol stack layer of the first UE, an indication of a list of IDs associated with one or more second UEs. The operations of 1305 may be performed in accordance with examples as disclosed herein. In some examples, aspects of the operations of 1305 may be performed by a list reception component 765 as described with reference to FIG. 7.

At 1310, the method may include reporting, to the second protocol stack layer, an indication of a set of resources available for a sidelink transmission for the first UE based on the list of IDs and SCI. The operations of 1310 may be performed in accordance with examples as disclosed herein. In some examples, aspects of the operations of 1310 may be performed by a resource reporting component 730 as described with reference to FIG. 7.

At 1315, the method may include receiving, from the second protocol stack layer, an indication of a resource of the set of resources for the sidelink transmission in response to reporting the indication of the set of resources. The operations of 1315 may be performed in accordance with examples as disclosed herein. In some examples, aspects of the operations of 1315 may be performed by a sidelink transmission resource reception component 740 as described with reference to FIG. 7.

Figure 14:
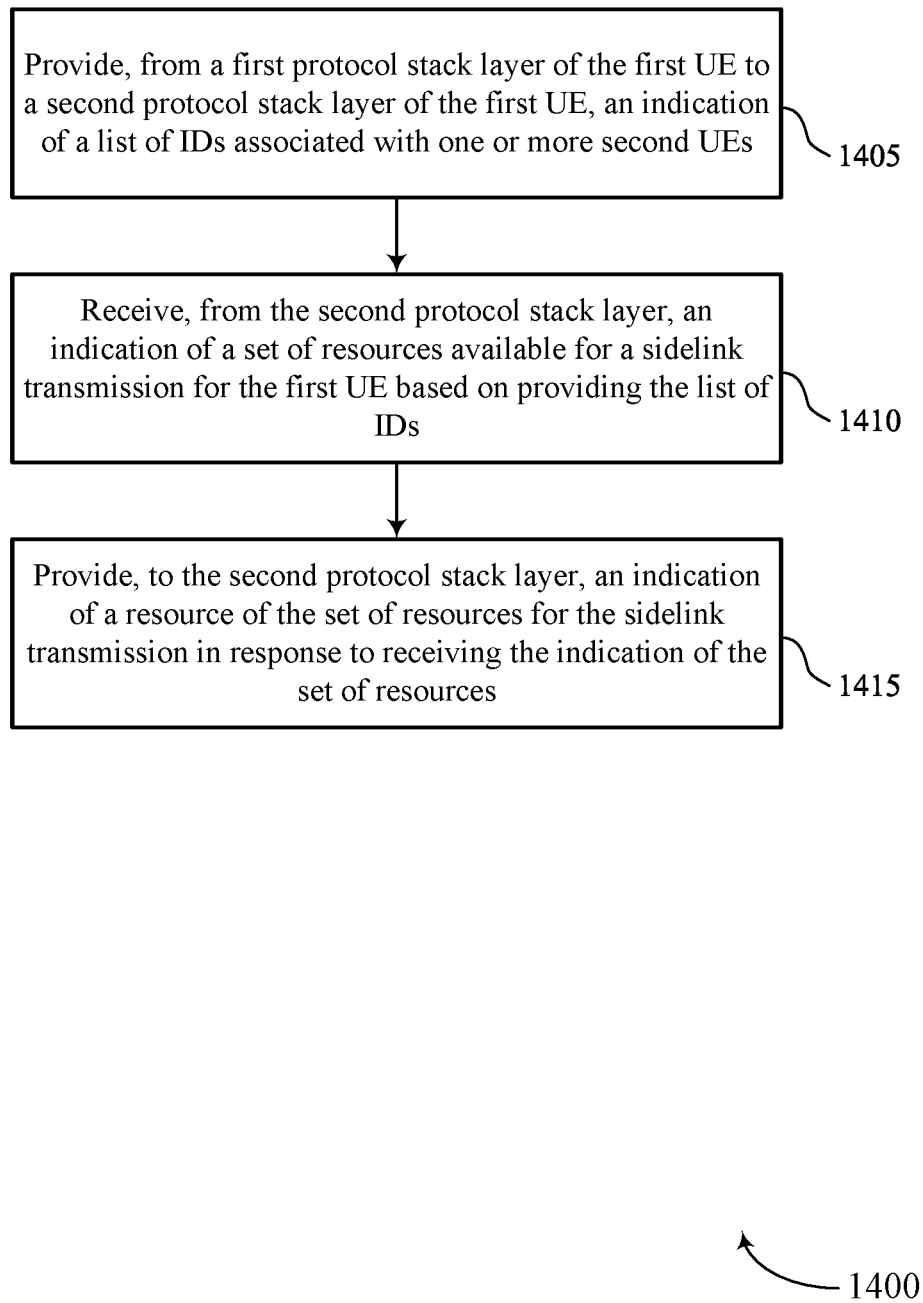

FIG. 14 shows a flowchart illustrating a method 1400 that supports techniques for sidelink resource selection in accordance with one or more aspects of the present disclosure.

The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include providing, from a first protocol stack layer of the first UE to a second protocol stack layer of the first UE, an indication of a list of IDs associated with one or more second UEs. The operations of 1405 may be performed in accordance with examples as disclosed herein. In some examples, aspects of the operations of 1405 may be performed by a list providing component 770 as described with reference to FIG. 7.

At 1410, the method may include receiving, from the second protocol stack layer, an indication of a set of resources available for a sidelink transmission for the first UE based on providing the list of IDs. The operations of 1410 may be performed in accordance with examples as disclosed herein. In some examples, aspects of the operations of 1410 may be performed by a resource reception component 750 as described with reference to FIG. 7.

At 1415, the method may include providing, to the second protocol stack layer, an indication of a resource of the set of resources for the sidelink transmission in response to receiving the indication of the set of resources. The operations of 1415 may be performed in accordance with examples as disclosed herein. In some examples, aspects of the operations of 1415 may be performed by a sidelink transmission resource providing component 760 as described with reference to FIG. 7.

The following provides an overview of aspects of the present disclosure:

Aspect 1: A method for wireless communication at a first UE, comprising: receiving, at a first protocol stack layer of the first UE from a second protocol stack layer of the first UE, an indication of a set of parameters; reporting, from a first protocol stack layer of the first UE to a the second protocol stack layer of the first UE, a set of resources available for a sidelink transmission for the first UE based at least in part on SCI and the set of parameters, the set of resources comprising one or more subsets of resources; reporting, to the second protocol stack layer, an indication of each subset of the set of resources; and receiving, from the second protocol stack layer, an indication of a resource of the set of resources for the sidelink transmission in response to reporting the indication of the one or more subsets of resources.

Aspect 2: The method of aspect 1, the reporting the indication of each subset of the set of resources comprising: indicating, for each subset of the set of resources, a respective type of the subset of resources.

Aspect 3: The method of any of aspects 1 through 2, the one or more subsets of resources comprising: a first subset of resources unassociated with SCI reserving resources for another sidelink transmission; or a second subset of resources reserved by SCI corresponding to an RSRP measurement being below a threshold; or a third subset of resources associated with spatial reuse of resources and reserved by SCI corresponding to an RSRP measurement satisfying a threshold; or any combination thereof.

Aspect 4: The method of aspect 3, the second subset of resources comprising: a first group of resources for which the first UE fails to decode second SCI identifying a second UE associated with transmissions on the first group of resources; or a second group of resources for which the first UE decodes second SCI that identifies a UE associated with transmissions on the second group of resources.

Aspect 5: The method of any of aspects 3 through 4, further comprising: reporting, to the second protocol stack layer, an indication of a respective transmit power constraint for each resource of the third subset of resources.

Aspect 6: The method of any of aspects 1 through 5, further comprising: reporting, to the second protocol stack layer, an ID of a transmitting UE or a receiving UE, or both, associated with a resource of the set of resources.

Aspect 7: The method of aspect 6, further comprising: receiving, from the second protocol stack layer, an indication to report the ID of the transmitting UE, or the receiving UE, or both, the reporting the ID based at least in part on receiving the indication to report the ID.

Aspect 8: The method of any of aspects 6 through 7, further comprising: determining that a percentage of total resources associated with the set of resources fails to meet a threshold percentage; and increasing an RSRP threshold for determining the set of resources, the reporting the set of resources based at least in part on increasing the RSRP threshold and the reporting the ID based at least in part on increasing the RSRP threshold.

Aspect 9: The method of any of aspects 6 through 8, further comprising: determining that an amount of resources of a first subset of the set of resources fails to meet a threshold, the first subset unassociated with SCI reserving resources for another sidelink transmission and the reporting the ID based at least in part on determining that the amount of resources of the first subset of the set of resources fails to meet the threshold.

Aspect 10: The method of any of aspects 6 through 9, further comprising: determining that an amount of resources of two or more subsets of the set of resources fails to meet a threshold, the reporting the ID based at least in part on determining that the amount of resources of the two or more subsets of the set of resources fails to meet the threshold.

Aspect 11: A method for wireless communication at a first UE, comprising: providing, from a first protocol stack layer of the first UE to a second protocol stack layer of the first UE, an indication of a set of parameters; receiving, at a first protocol stack layer of the first UE and from a the second protocol stack layer of the first UE, a report of a set of resources available for a sidelink transmission for the first UE, the set of resources comprising one or more subsets of resources; receiving, from the second protocol stack layer, an indication of each subset of the set of resources; providing, to the second protocol stack layer, an indication of a resource of the set of resources for the sidelink transmission in response to receiving the indication of the one or more subsets of resources.

Aspect 12: The method of aspect 11, the receiving the indication of each subset of the set of resources comprising: receiving, for each subset of the set of resources, an indication of a respective type of the subset of resources.

Aspect 13: The method of any of aspects 11 through 12, the one or more subsets of resources comprising: a first subset of resources unassociated with SCI reserving resources for another sidelink transmission; or a second subset of resources reserved by SCI corresponding to an RSRP measurement being below a threshold; or a third subset of resources associated with spatial reuse of resources and reserved by SCI corresponding to an RSRP measurement satisfying a threshold; or any combination thereof.

Aspect 14: The method of aspect 13, the second subset of resources comprising: a first group of resources for which the first UE fails to decode second SCI identifying a second UE associated with transmissions on the first group of resources; or a second group of resources for which the first UE decodes second SCI that identifies a UE associated with transmissions on the second group of resources.

Aspect 15: The method of any of aspects 13 through 14, further comprising: receiving, from the second protocol stack layer, an indication of a respective transmit power constraint for each resource of the third subset of resources.

Aspect 16: The method of any of aspects 11 through 15, further comprising: receiving, from the second protocol stack layer, an ID of a transmitting UE or a receiving UE, or both, associated with a resource of the set of resources.

Aspect 17: The method of any of aspects 11 through 16, further comprising: providing, to the second protocol stack layer, an indication to report the ID of the transmitting UE, or the receiving UE, or both, the receiving the ID based at least in part on providing the indication to report the ID.

Aspect 18: The method of any of aspects 11 through 17, further comprising: determining a respective probability for each subset of the one or more subsets; and selecting the resource for the sidelink transmission from the set of resources based at least in part on the respective probability for the one or more subsets, the providing the indication of the resource for the sidelink transmission based at least in part on selecting the resource.

Aspect 19: The method of aspect 18, the respective probability for the one or more subsets based at least in part on a traffic priority for the sidelink transmission, or a type of the one or more subsets, or an ID associated with a second UE, or a transmit power for the sidelink transmission, or a transmit power constraint, or a retransmission status of the sidelink transmission, or any combination thereof.

Aspect 20: The method of any of aspects 11 through 17, further comprising: selecting the resource for the sidelink transmission from the set of resources based at least in part on a sequence associated with the one or more subsets, the providing the indication of the resource for the sidelink transmission based at least in part on selecting the resource.

Aspect 21: The method of any of aspects 11 through 17, further comprising: selecting the resource for the sidelink transmission from a subset of the one or more subsets based at least in part on a priority of the sidelink transmission, the providing the indication of the resource for the sidelink transmission based at least in part on selecting the resource.

Aspect 22: A method for wireless communication at a UE, comprising: receiving, at a first protocol stack layer of the first UE and from a second protocol stack layer of the first UE, an indication of a list of IDs associated with one or more second UEs; reporting, to the second protocol stack layer, an indication of a set of resources available for a sidelink transmission for the first UE based at least in part on the list of IDs and SCI; and receiving, from the second protocol stack layer, an indication of a resource of the set of resources for the sidelink transmission in response to reporting the indication of the set of resources.

Aspect 23: The method of aspect 22, further comprising: receiving first SCI indicating a scheduled sidelink transmission for a third UE; and determining whether the third UE is associated with an ID of the list of IDs based at least in part on receiving the first SCI.

Aspect 24: The method of aspect 23, further comprising: determining that the third UE is associated with an ID of the list of IDs; and comparing an RSRP associated with the first SCI with a first RSRP threshold corresponding to the list of IDs based at least in part on determining that the third UE is associated with an ID of the list of IDs.

Aspect 25: The method of aspect 24, further comprising: determining that a percentage of total resources associated with the set of resources fails to meet a threshold percentage; increasing the first RSRP threshold by a first amount for determining the set of resources, the reporting the set of resources based at least in part on increasing the first RSRP threshold; and increasing a second RSRP threshold associated with one or more third UEs by the first amount for determining the set of resources, the reporting the set of resources based at least in part on increasing the second RSRP threshold.

Aspect 26: The method of aspect 24, further comprising: determining that a percentage of total resources associated with the set of resources fails to meet a threshold percentage; increasing the first RSRP threshold by a first amount for determining the set of resources, the reporting the set of resources based at least in part on increasing the first RSRP threshold; and increasing a second RSRP threshold associated with one or more third UEs by a second amount for determining the set of resources, the reporting the set of resources based at least in part on increasing the second RSRP threshold.

Aspect 27: The method of aspect 22, further comprising: receiving first SCI indicating a scheduled sidelink transmission for a second UE of the one or more second UEs; and comparing an RSRP associated with the first SCI with a first RSRP threshold equal to a second RSRP threshold associated with one or more third UEs, the reporting the set of resources based at least in part on comparing the RSRP with the first RSRP threshold.

Aspect 28: The method of aspect 27, further comprising: determining that a percentage of total resources associated with the set of resources fails to meet a threshold percentage; increasing the first RSRP threshold by a first amount for determining the set of resources, the reporting the set of resources based at least in part on increasing the first RSRP threshold; and increasing the second RSRP threshold by a second amount for determining the set of resources, the reporting the set of resources based at least in part on increasing the second RSRP threshold.

Aspect 29: A method for wireless communication at a first UE, comprising: providing, from a first protocol stack layer of the first UE to a second protocol stack layer of the first UE, an indication of a list of IDs associated with one or more second UEs; receiving, from the second protocol stack layer, an indication of a set of resources available for a sidelink transmission for the first UE based at least in part on providing the list of IDs; providing, to the second protocol stack layer, an indication of a resource of the set of resources for the sidelink transmission in response to receiving the indication of the set of resources.

Aspect 30: The method of aspect 29, further comprising: determining the list of IDs based at least in part on communications with the one or more second UEs, the providing the indication of the list of IDs based at least in part on determining the list of IDs.

Aspect 31: The method of aspect 30, the communications indicating group information comprising a speed or a velocity, or both, associated with the one or more second UEs.

Aspect 32: The method of any of aspects 29 through 31, the one or more second UEs associated with a first RSRP threshold for determining the set of resources and one or more other UEs associated with a second RSRP threshold for determining the set of resources.

Aspect 33: The method of any of aspects 29 through 32, the one or more second UEs associated with a first amount of an RSRP threshold increase for determining the set of resources and one or more other UEs associated with a second amount of an RSRP threshold increase for determining the set of resources.

Aspect 34: An apparatus for wireless communication at a first UE, comprising a processor; and memory coupled to the processor, the processor and memory configured to perform a method of any of aspects 1 through 10.

Aspect 35: An apparatus for wireless communication at a first UE, comprising at least one means for performing a method of any of aspects 1 through 10.

Aspect 36: A non-transitory computer-readable medium storing code for wireless communication at a first UE, the code comprising instructions executable by a processor to perform a method of any of aspects 1 through 10.

Aspect 37: An apparatus for wireless communication at a first UE, comprising a processor; and memory coupled to the processor, the processor and memory configured to perform a method of any of aspects 11 through 21.

Aspect 38: An apparatus for wireless communication at a first UE, comprising at least one means for performing a method of any of aspects 11 through 21.

Aspect 39: A non-transitory computer-readable medium storing code for wireless communication at a first UE, the code comprising instructions executable by a processor to perform a method of any of aspects 11 through 21.

Aspect 40: An apparatus for wireless communication at a UE, comprising a processor; and memory coupled to the processor, the processor and memory configured to perform a method of any of aspects 22 through 28.

Aspect 41: An apparatus for wireless communication at a UE, comprising at least one means for performing a method of any of aspects 22 through 28.

Aspect 42: A non-transitory computer-readable medium storing code for wireless communication at a UE, the code comprising instructions executable by a processor to perform a method of any of aspects 22 through 28.

Aspect 43: An apparatus for wireless communication at a first UE, comprising a processor; and memory coupled to the processor, the processor and memory configured to perform a method of any of aspects 29 through 33.

Aspect 44: An apparatus for wireless communication at a first UE, comprising at least one means for performing a method of any of aspects 29 through 33.

Aspect 45: A non-transitory computer-readable medium storing code for wireless communication at a first UE, the code comprising instructions executable by a processor to perform a method of any of aspects 29 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
    obtaining, at a first protocol stack layer of the first UE from a second protocol stack layer of the first UE, an indication of a set of parameters;
    reporting, from the first protocol stack layer of the first UE to the second protocol stack layer of the first UE, a set of resources available for a sidelink transmission for the first UE based at least in part on sidelink control information and the set of parameters, the set of resources comprising one or more subsets of resources;
    reporting, to the second protocol stack layer, an indication of each subset of the set of resources; and
    obtaining, from the second protocol stack layer, an indication of a resource of the set of resources for the sidelink transmission in response to reporting the indication of the one or more subsets of resources.

2. The method of claim 1, the reporting the indication of each subset of the set of resources comprising:
    indicating, for each subset of the set of resources, a respective type of the subset of resources.

3. The method of claim 1, the one or more subsets of resources comprising:
    a first subset of resources unassociated with sidelink control information reserving resources for another sidelink transmission; or
    a second subset of resources reserved by sidelink control information corresponding to a reference signal received power measurement being below a threshold; or
    a third subset of resources associated with spatial reuse of resources and reserved by sidelink control information corresponding to a reference signal received power measurement satisfying a threshold; or
    any combination thereof.

4. The method of claim 3, the second subset of resources comprising:
    a first group of resources for which the first UE fails to decode second sidelink control information identifying a second UE associated with transmissions on the first group of resources; or
    a second group of resources for which the first UE decodes second sidelink control information that identifies a second UE associated with transmissions on the second group of resources.

5. The method of claim 3, further comprising:
    reporting, to the second protocol stack layer, an indication of a respective transmit power constraint for each resource of the third subset of resources.

6. The method of claim 1, further comprising:
    reporting, to the second protocol stack layer, an identifier of a transmitting UE or a receiving UE, or both, associated with a resource of the set of resources.

7. The method of claim 6, further comprising:
    obtaining, from the second protocol stack layer, an indication to report the identifier of the transmitting UE, or the receiving UE, or both, the reporting the identifier based at least in part on obtaining the indication to report the identifier.

8. The method of claim 6, further comprising:
    determining that a percentage of total resources associated with the set of resources fails to meet a threshold percentage; and
    increasing a reference signal received power threshold for determining the set of resources, the reporting the set of resources being based at least in part on increasing the reference signal received power threshold and the reporting the identifier based at least in part on increasing the reference signal received power threshold.

9. The method of claim 6, further comprising:
    determining that an amount of resources of a first subset of the set of resources fails to meet a threshold, the first subset unassociated with sidelink control information reserving resources for another sidelink transmission and the reporting the identifier based at least in part on determining that the amount of resources of the first subset of the set of resources fails to meet the threshold.

10. The method of claim 6, further comprising:
    determining that an amount of resources of two or more subsets of the set of resources fails to meet a threshold, the reporting the identifier based at least in part on determining that the amount of resources of the two or more subsets of the set of resources fails to meet the threshold.

11. A method for wireless communication at a first user equipment (UE), comprising:

outputting, from a first protocol stack layer of the first UE to a second protocol stack layer of the first UE, an indication of a set of parameters;

obtaining, at the first protocol stack layer of the first UE and from the second protocol stack layer of the first UE, a report of a set of resources available for a sidelink transmission for the first UE, the set of resources comprising one or more subsets of resources;

obtaining, from the second protocol stack layer, an indication of each subset of the set of resources; and outputting, to the second protocol stack layer, an indication of a resource of the set of resources for the sidelink transmission in response to obtaining the indication of the one or more subsets of resources.

12. The method of claim 11, the obtaining the indication of each subset of the set of resources comprising:
obtaining, for each subset of the set of resources, an indication of a respective type of the subset of resources.

13. The method of claim 11, the one or more subsets of resources comprising:
a first subset of resources unassociated with sidelink control information reserving resources for another sidelink transmission; or
a second subset of resources reserved by sidelink control information corresponding to a reference signal received power measurement being below a threshold; or
a third subset of resources associated with spatial reuse of resources and reserved by sidelink control information corresponding to a reference signal received power measurement satisfying a threshold; or
any combination thereof.

14. The method of claim 13, the second subset of resources comprising:
a first group of resources for which the first UE fails to decode second sidelink control information identifying a second UE associated with transmissions on the first group of resources; or
a second group of resources for which the first UE decodes second sidelink control information that identifies a second UE associated with transmissions on the second group of resources.

15. The method of claim 13, further comprising:
obtaining, from the second protocol stack layer, an indication of a respective transmit power constraint for each resource of the third subset of resources.

16. The method of claim 11, further comprising:
obtaining, from the second protocol stack layer, an identifier of a transmitting UE or a receiving UE, or both, associated with a resource of the set of resources.

17. The method of claim 16, further comprising:
outputting, to the second protocol stack layer, an indication to report the identifier of the transmitting UE, or the receiving UE, or both, the obtaining the identifier based at least in part on outputting the indication to report the identifier.

18. The method of claim 11, further comprising:
determining a respective probability for each subset of the one or more subsets; and
selecting the resource for the sidelink transmission from the set of resources based at least in part on the respective probability for the one or more subsets, the outputting the indication of the resource for the sidelink transmission based at least in part on selecting the resource.

19. The method of claim 18, the respective probability for the one or more subsets based at least in part on a traffic priority for the sidelink transmission, or a type of the one or more subsets, or an identifier associated with a second UE, or a transmit power for the sidelink transmission, or a transmit power constraint, or a retransmission status of the sidelink transmission, or any combination thereof.

20. The method of claim 11, further comprising:
selecting the resource for the sidelink transmission from the set of resources based at least in part on a sequence associated with the one or more subsets, the outputting the indication of the resource for the sidelink transmission based at least in part on selecting the resource.

21. The method of claim 11, further comprising:
selecting the resource for the sidelink transmission from a subset of the one or more subsets based at least in part on a priority of the sidelink transmission, the outputting the indication of the resource for the sidelink transmission based at least in part on selecting the resource.

22. A method for wireless communication at a user equipment (UE), comprising:
obtaining, at a first protocol stack layer of the first UE and from a second protocol stack layer of the first UE, an indication of a list of identifiers associated with one or more second UEs;
reporting, to the second protocol stack layer, an indication of a set of resources available for a sidelink transmission for the first UE based at least in part on the list of identifiers and sidelink control information; and
obtaining, from the second protocol stack layer, an indication of a resource of the set of resources for the sidelink transmission in response to reporting the indication of the set of resources.

23. The method of claim 22, further comprising:
obtaining first sidelink control information indicating a scheduled sidelink transmission for a third UE; and
determining whether the third UE is associated with an identifier of the list of identifiers based at least in part on obtaining the first sidelink control information.

24. The method of claim 23, further comprising:
determining that the third UE is associated with an identifier of the list of identifiers; and
comparing a reference signal received power associated with the first sidelink control information with a first reference signal received power threshold corresponding to the list of identifiers based at least in part on determining that the third UE is associated with an identifier of the list of identifiers.

25. The method of claim 24, further comprising:
determining that a percentage of total resources associated with the set of resources fails to meet a threshold percentage;
increasing the first reference signal received power threshold by a first amount for determining the set of resources, the reporting the set of resources based at least in part on increasing the first reference signal received power threshold; and
increasing a second reference signal received power threshold associated with one or more third UEs by the first amount for determining the set of resources, the reporting the set of resources based at least in part on increasing the second reference signal received power threshold.

26. The method of claim 24, further comprising:
determining that a percentage of total resources associated with the set of resources fails to meet a threshold percentage;

increasing the first reference signal received power threshold by a first amount for determining the set of resources, the reporting the set of resources based at least in part on increasing the first reference signal received power threshold; and increasing a second reference signal received power threshold associated with one or more third UEs by a second amount for determining the set of resources, the reporting the set of resources based at least in part on increasing the second reference signal received power threshold.

27. The method of claim 22, further comprising:
obtaining first sidelink control information indicating a scheduled sidelink transmission for a second UE of the one or more second UEs; and
comparing a reference signal received power associated with the first sidelink control information with a first reference signal received power threshold equal to a second reference signal received power threshold associated with one or more third UEs, the reporting the set of resources based at least in part on comparing the reference signal received power with the first reference signal received power threshold.

28. The method of claim 27, further comprising:
determining that a percentage of total resources associated with the set of resources fails to meet a threshold percentage;
increasing the first reference signal received power threshold by a first amount for determining the set of resources, the reporting the set of resources based at least in part on increasing the first reference signal received power threshold; and
increasing the second reference signal received power threshold by a second amount for determining the set of resources, the reporting the set of resources based at least in part on increasing the second reference signal received power threshold.

29. A method for wireless communication at a first user equipment (UE), comprising:
outputting, from a first protocol stack layer of the first UE to a second protocol stack layer of the first UE, an indication of a list of identifiers associated with one or more second UEs;
obtaining, from the second protocol stack layer, an indication of a set of resources available for a sidelink transmission for the first UE based at least in part on outputting the list of identifiers; and
outputting, to the second protocol stack layer, an indication of a resource of the set of resources for the sidelink transmission in response to obtaining the indication of the set of resources.

30. The method of claim 29, further comprising:
determining the list of identifiers based at least in part on communications with the one or more second UEs, the outputting the indication of the list of identifiers based at least in part on determining the list of identifiers.

31. The method of claim 30, the communications indicating group information comprising a speed or a velocity, or both, associated with the one or more second UEs.

32. The method of claim 29, the one or more second UEs associated with a first reference signal received power threshold for determining the set of resources and one or more other UEs associated with a second reference signal received power threshold for determining the set of resources.

33. The method of claim 29, the one or more second UEs associated with a first amount of a reference signal received power threshold increase for determining the set of resources and one or more other UEs associated with a second amount of a reference signal received power threshold increase for determining the set of resources.

34. An apparatus for wireless communication at a first user equipment (UE), comprising:
a processor; and
memory coupled with the processor, the processor configured to:
obtain, at a first protocol stack layer of the first UE from a second protocol stack layer of the first UE, an indication of a set of parameters;
report, from the first protocol stack layer of the first UE to the second protocol stack layer of the first UE, a set of resources available for a sidelink transmission for the first UE based at least in part on sidelink control information and the set of parameters, the set of resources comprising one or more subsets of resources;
report, to the second protocol stack layer, an indication of each subset of the set of resources; and
obtain, from the second protocol stack layer, an indication of a resource of the set of resources for the sidelink transmission in response to the report of the indication of the one or more subsets of resources.

35. The apparatus of claim 34, the processor further configured to:
indicate, for each subset of the set of resources, a respective type of the subset of resources.

36. The apparatus of claim 34, the one or more subsets of resources comprising:
a first subset of resources unassociated with sidelink control information that reserves resources for another sidelink transmission; or
a second subset of resources reserved by sidelink control information that corresponds to a reference signal received power measurement below a threshold; or
a third subset of resources associated with spatial reuse of resources and reserved by sidelink control information that corresponds to a reference signal received power measurement that satisfies a threshold; or
any combination thereof.

37. The apparatus of claim 36, the second subset of resources comprising:
a first group of resources for which the first UE fails to decode second sidelink control information that identifies a second UE associated with transmissions on the first group of resources; or
a second group of resources for which the first UE decodes second sidelink control information that identifies a second UE associated with transmissions on the second group of resources.

38. The apparatus of claim 36, the processor further configured to:
report, to the second protocol stack layer, an indication of a respective transmit power constraint for each resource of the third subset of resources.

39. The apparatus of claim 34, the processor further configured to:
report, to the second protocol stack layer, an identifier of a transmitting UE or a receiving UE, or both, associated with a resource of the set of resources.

40. The apparatus of claim 39, the processor further configured to:
obtain, from the second protocol stack layer, an indication to report the identifier of the transmitting UE, or the receiving UE, or both, the report of the identifier based at least in part on the indication to report the identifier.

41. The apparatus of claim 39, the processor further configured to:
   determine that a percentage of total resources associated with the set of resources fails to meet a threshold percentage; and
   increase a reference signal received power threshold for the determination of the set of resources, the report of the set of resources based at least in part on the increase of the reference signal received power threshold and the report of the identifier based at least in part on the increase of the reference signal received power threshold.

42. The apparatus of claim 39, the processor further configured to:
   determine that an amount of resources of a first subset of the set of resources fails to meet a threshold, the first subset unassociated with sidelink control information that reserves resources for another sidelink transmission and the report of the identifier based at least in part on a determination that the amount of resources of the first subset of the set of resources fails to meet the threshold.

43. The apparatus of claim 39, the processor further configured to:
   determine that an amount of resources of two or more subsets of the set of resources fails to meet a threshold, the report of the identifier based at least in part on a determination that the amount of resources of the two or more subsets of the set of resources fails to meet the threshold.

44. A non-transitory computer-readable medium storing code for wireless communication at a first user equipment (UE), the code comprising instructions executable by a processor to:
   obtain, at a first protocol stack layer of the first UE from a second protocol stack layer of the first UE, an indication of a set of parameters;
   report, from the first protocol stack layer of the first UE to the second protocol stack layer of the first UE, a set of resources available for a sidelink transmission for the first UE based at least in part on sidelink control information and the set of parameters, the set of resources comprising one or more subsets of resources;
   report, to the second protocol stack layer, an indication of each subset of the set of resources; and
   obtain, from the second protocol stack layer, an indication of a resource of the set of resources for the sidelink transmission in response to reporting the indication of the one or more subsets of resources.

45. The non-transitory computer-readable medium of claim 44, the code further comprising instructions executable by the processor to:
   indicate, for each subset of the set of resources, a respective type of the subset of resources.

46. The non-transitory computer-readable medium of claim 44, the one or more subsets of resources comprising:
   a first subset of resources unassociated with sidelink control information reserving resources for another sidelink transmission; or
   a second subset of resources reserved by sidelink control information corresponding to a reference signal received power measurement being below a threshold; or
   a third subset of resources associated with spatial reuse of resources and reserved by sidelink control information corresponding to a reference signal received power measurement satisfying a threshold; or
   any combination thereof.

47. An apparatus for wireless communication at a first user equipment (UE), comprising:
   a processor; and
   memory coupled with the processor, the processor configured to:
      output, from a first protocol stack layer of the first UE to a second protocol stack layer of the first UE, an indication of a set of parameters;
      obtain, at the first protocol stack layer of the first UE and from the second protocol stack layer of the first UE, a report of a set of resources available for a sidelink transmission for the first UE, the set of resources comprising one or more subsets of resources;
      obtain, from the second protocol stack layer, an indication of each subset of the set of resources; and
      output, to the second protocol stack layer, an indication of a resource of the set of resources for the sidelink transmission in response to the indication of the one or more subsets of resources.

48. The apparatus of claim 47, the processor further configured to:
   obtain, for each subset of the set of resources, an indication of a respective type of the subset of resources.

49. The apparatus of claim 47, the one or more subsets of resources comprising:
   a first subset of resources unassociated with sidelink control information that reserves resources for another sidelink transmission; or
   a second subset of resources reserved by sidelink control information that corresponds to a reference signal received power measurement below a threshold; or
   a third subset of resources associated with spatial reuse of resources and reserved by sidelink control information that corresponds to a reference signal received power measurement that satisfies a threshold; or
   any combination thereof.

50. The apparatus of claim 49, the second subset of resources comprising:
   a first group of resources for which the first UE fails to decode second sidelink control information that identifies a second UE associated with transmissions on the first group of resources; or
   a second group of resources for which the first UE decodes second sidelink control information that identifies a second UE associated with transmissions on the second group of resources.

51. The apparatus of claim 49, the processor further configured to:
   obtain, from the second protocol stack layer, an indication of a respective transmit power constraint for each resource of the third subset of resources.

52. The apparatus of claim 47, the processor further configured to:
   obtain, from the second protocol stack layer, an identifier of a transmitting UE or a receiving UE, or both, associated with a resource of the set of resources.

53. The apparatus of claim 52, the processor further configured to:
   output, to the second protocol stack layer, an indication to report the identifier of the transmitting UE, or the receiving UE, or both, the obtainment of the identifier based at least in part on the indication to report the identifier.

54. The apparatus of claim 47, the processor further configured to:
  determine a respective probability for each subset of the one or more subsets; and
  select the resource for the sidelink transmission from the set of resources based at least in part on the respective probability for the one or more subsets, the indication of the resource for the sidelink transmission based at least in part on the selection of the resource.

55. The apparatus of claim 54, the respective probability for the one or more subsets based at least in part on a traffic priority for the sidelink transmission, or a type of the one or more subsets, or an identifier associated with a second UE, or a transmit power for the sidelink transmission, or a transmit power constraint, or a retransmission status of the sidelink transmission, or any combination thereof.

56. The apparatus of claim 47, the processor further configured to:
  select the resource for the sidelink transmission from the set of resources based at least in part on a sequence associated with the one or more subsets, the indication of the resource for the sidelink transmission based at least in part on the selection of the resource.

57. The apparatus of claim 47, the processor further configured to:
  select the resource for the sidelink transmission from a subset of the one or more subsets based at least in part on a priority of the sidelink transmission, the indication of the resource for the sidelink transmission based at least in part on the selection of the resource.

58. A non-transitory computer-readable medium storing code for wireless communication at a first user equipment (UE), the code comprising instructions executable by a processor to:
  output, from a first protocol stack layer of the first UE to a second protocol stack layer of the first UE, an indication of a set of parameters;
  obtain, at the first protocol stack layer of the first UE and from the second protocol stack layer of the first UE, a report of a set of resources available for a sidelink transmission for the first UE, the set of resources comprising one or more subsets of resources;
  obtain, from the second protocol stack layer, an indication of each subset of the set of resources; and
  output, to the second protocol stack layer, an indication of a resource of the set of resources for the sidelink transmission in response to obtaining the indication of the one or more subsets of resources.

59. The non-transitory computer-readable medium of claim 58, the code further comprising instructions executable by the processor to:
  obtain, for each subset of the set of resources, an indication of a respective type of the subset of resources.

60. The non-transitory computer-readable medium of claim 58, the one or more subsets of resources comprising:
  a first subset of resources unassociated with sidelink control information reserving resources for another sidelink transmission; or
  a second subset of resources reserved by sidelink control information corresponding to a reference signal received power measurement being below a threshold; or
  a third subset of resources associated with spatial reuse of resources and reserved by sidelink control information corresponding to a reference signal received power measurement satisfying a threshold; or
  any combination thereof.

61. An apparatus for wireless communication at a first user equipment (UE), comprising:
  a processor; and
  memory coupled with the processor, the processor configured to:
    obtain, at a first protocol stack layer of the first UE and from a second protocol stack layer of the first UE, an indication of a list of identifiers associated with one or more second UEs;
    report, to the second protocol stack layer, an indication of a set of resources available for a sidelink transmission for the first UE based at least in part on the list of identifiers and sidelink control information; and
    obtain, from the second protocol stack layer, an indication of a resource of the set of resources for the sidelink transmission in response to the report of the indication of the set of resources.

62. The apparatus of claim 61, the processor further configured to:
  obtain first sidelink control information that indicates a scheduled sidelink transmission for a third UE; and
  determine whether the third UE is associated with an identifier of the list of identifiers based at least in part on the obtainment of the first sidelink control information.

63. The apparatus of claim 62, the processor further configured to:
  determine that the third UE is associated with an identifier of the list of identifiers; and
  compare a reference signal received power associated with the first sidelink control information with a first reference signal received power threshold that corresponds to the list of identifiers based at least in part on the determination that the third UE is associated with an identifier of the list of identifiers.

64. The apparatus of claim 63, the processor further configured to:
  determine that a percentage of total resources associated with the set of resources fails to meet a threshold percentage;
  increase the first reference signal received power threshold by a first amount for determination of the set of resources, the report of the set of resources based at least in part on the increase of the first reference signal received power threshold; and
  increase a second reference signal received power threshold associated with one or more third UEs by the first amount for determination of the set of resources, the report of the set of resources based at least in part on the increase of the second reference signal received power threshold.

65. The apparatus of claim 63, the processor further configured to:
  determine that a percentage of total resources associated with the set of resources fails to meet a threshold percentage;
  increase the first reference signal received power threshold by a first amount for determination of the set of resources, the report of the set of resources based at least in part on the increase of the first reference signal received power threshold; and
  increase a second reference signal received power threshold associated with one or more third UEs by a second amount for determination of the set of resources, the report of the set of resources based at least in part on the increase of the second reference signal received power threshold.

66. The apparatus of claim 61, the processor further configured to:
obtain first sidelink control information that indicates a scheduled sidelink transmission for a second UE of the one or more second UEs; and
compare a reference signal received power associated with the first sidelink control information with a first reference signal received power threshold equal to a second reference signal received power threshold associated with one or more third UEs, the report of the set of resources based at least in part on the comparison of the reference signal received power with the first reference signal received power threshold.

67. The apparatus of claim 66, the processor further configured to:
determine that a percentage of total resources associated with the set of resources fails to meet a threshold percentage;
increase the first reference signal received power threshold by a first amount for determination of the set of resources, the report of the set of resources based at least in part on the increase of the first reference signal received power threshold; and
increase the second reference signal received power threshold by a second amount for determination of the set of resources, the report of the set of resources based at least in part on the increase of the second reference signal received power threshold.

68. A non-transitory computer-readable medium storing code for wireless communication at a first user equipment (UE), the code comprising instructions executable by a processor to:
obtain, at a first protocol stack layer of the first UE and from a second protocol stack layer of the first UE, an indication of a list of identifiers associated with one or more second UEs;
report, to the second protocol stack layer, an indication of a set of resources available for a sidelink transmission for the first UE based at least in part on the list of identifiers and sidelink control information; and
obtain, from the second protocol stack layer, an indication of a resource of the set of resources for the sidelink transmission in response to reporting the indication of the set of resources.

69. The non-transitory computer-readable medium of claim 68, the code further comprising instructions executable by the processor to:
obtain first sidelink control information indicating a scheduled sidelink transmission for a third UE; and
determine whether the third UE is associated with an identifier of the list of identifiers based at least in part on obtaining the first sidelink control information.

70. The non-transitory computer-readable medium of claim 68, the code further comprising instructions executable by the processor to:
obtain first sidelink control information indicating a scheduled sidelink transmission for a second UE of the one or more second UEs; and
compare a reference signal received power associated with the first sidelink control information with a first reference signal received power threshold equal to a second reference signal received power threshold associated with one or more third UEs, the reporting the set of resources based at least in part on comparing the reference signal received power with the first reference signal received power threshold.

71. An apparatus for wireless communication at a first user equipment (UE), comprising:
a processor; and
memory coupled with the processor, the processor configured to:
output, from a first protocol stack layer of the first UE to a second protocol stack layer of the first UE, an indication of a list of identifiers associated with one or more second UEs;
obtain, from the second protocol stack layer, an indication of a set of resources available for a sidelink transmission for the first UE based at least in part on the list of identifiers; and
output, to the second protocol stack layer, an indication of a resource of the set of resources for the sidelink transmission in response to the indication of the set of resources.

72. The apparatus of claim 71, the processor further configured to:
determine the list of identifiers based at least in part on communications with the one or more second UEs, the indication of the list of identifiers based at least in part on the determination of the list of identifiers.

73. The apparatus of claim 72, the communications indicative of group information that comprises a speed or a velocity, or both, associated with the one or more second UEs.

74. The apparatus of claim 71, the one or more second UEs associated with a first reference signal received power threshold for determination of the set of resources and one or more other UEs associated with a second reference signal received power threshold for determination of the set of resources.

75. The apparatus of claim 71, the one or more second UEs associated with a first amount of a reference signal received power threshold increase for determination of the set of resources and one or more other UEs associated with a second amount of a reference signal received power threshold increase for determination of the set of resources.

76. A non-transitory computer-readable medium storing code for wireless communication at a first user equipment (UE), the code comprising instructions executable by a processor to:
output, from a first protocol stack layer of the first UE to a second protocol stack layer of the first UE, an indication of a list of identifiers associated with one or more second UEs;
obtain, from the second protocol stack layer, an indication of a set of resources available for a sidelink transmission for the first UE based at least in part on outputting the list of identifiers; and
output, to the second protocol stack layer, an indication of a resource of the set of resources for the sidelink transmission in response to obtaining the indication of the set of resources.

77. The non-transitory computer-readable medium of claim 76, the code further comprising instructions executable by the processor to:
determine the list of identifiers based at least in part on communications with the one or more second UEs, the outputting the indication of the list of identifiers based at least in part on determining the list of identifiers.

78. The non-transitory computer-readable medium of claim 77, the communications indicating group information comprising a speed or a velocity, or both, associated with the one or more second UEs.

* * * * *